United States Patent
Yu et al.

(10) Patent No.: US 10,861,168 B2
(45) Date of Patent: Dec. 8, 2020

(54) RELEVANT MOTION DETECTION IN VIDEO

(71) Applicant: Comcast Cable Communications, LLC, Philadelphia, PA (US)

(72) Inventors: Ruichi Yu, Greenbelt, MD (US); Hongcheng Wang, Arlington, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/125,203

(22) Filed: Sep. 7, 2018

(65) Prior Publication Data

US 2019/0244366 A1 Aug. 8, 2019

Related U.S. Application Data

(60) Provisional application No. 62/555,501, filed on Sep. 7, 2017.

(51) Int. Cl.
*G06K 9/00* (2006.01)
*G06T 7/246* (2017.01)
*G06N 5/04* (2006.01)
*G06T 7/254* (2017.01)

(52) U.S. Cl.
CPC ............ *G06T 7/246* (2017.01); *G06N 5/046* (2013.01); *G06T 7/254* (2017.01); *G06T 2207/20081* (2013.01); *G06T 2207/20084* (2013.01); *G06T 2207/30232* (2013.01)

(58) Field of Classification Search
CPC ............ G06T 7/246; G06T 7/254; G06T 2207/20084; G06T 2207/20081; G06T 2207/30232; G06N 5/046; G06N 3/0454; G06N 3/08

USPC .......................................................... 382/103
See application file for complete search history.

(56) References Cited

U.S. PATENT DOCUMENTS

| | | | |
|---|---|---|---|
| 9,430,923 B2* | 8/2016 | Kniffen | G06F 3/04855 |
| 9,984,466 B1* | 5/2018 | Duran | G06T 7/292 |
| 10,026,007 B1* | 7/2018 | Morton | H04N 5/77 |
| 10,270,642 B2* | 4/2019 | Zhang | H04L 27/362 |
| 2007/0263905 A1* | 11/2007 | Chang | H04N 5/144 |
| | | | 382/107 |

(Continued)

OTHER PUBLICATIONS

M. S. A. Akbarian, F. Saleh, B. Fernando, M. Salzmann, L. Petersson, and L. Andersson, "Deep Action- and Context-Aware Sequence Learning for Activity Recognition and Anticipation", Australian National University, Smart Vision Systems, CSIRO, VLAB, EPFL, Nov. 2016. Retrieved from: https://arxiv.org/abs/1611.05520.

(Continued)

*Primary Examiner* — Van D Huynh
(74) *Attorney, Agent, or Firm* — Banner & Witcoff, Ltd.

(57) ABSTRACT

Methods, systems, and/or apparatuses are described for detecting relevant motion of objects of interest (e.g., persons and vehicles) in surveillance videos. As described herein input data based on a plurality of captured images and/or video is received. The input data may then be pre-processed and used as an input into a convolution network that may, in some instances, have elements that perform both spatial-wise max pooling and temporal-wise max pooling. Based on The convolution network may be used to generate a plurality of prediction results of relevant motion of the objects of interest.

20 Claims, 12 Drawing Sheets

(56) References Cited

U.S. PATENT DOCUMENTS

| | | | | |
|---|---|---|---|---|
| 2010/0034423 | A1* | 2/2010 | Zhao | G06T 7/12 382/103 |
| 2010/0290710 | A1* | 11/2010 | Gagvani | H04N 5/91 382/224 |
| 2016/0171311 | A1* | 6/2016 | Case | G06K 9/00771 382/103 |
| 2019/0057588 | A1* | 2/2019 | Savvides | G06T 7/254 |

OTHER PUBLICATIONS

M. Babaee, D. Dinh, and G. Rigoll, "A Deep Convolutional Neural Network for Background Subtraction", Institute for Human-Machine Communication, Technical Univ. of Munich, Germany, Feb. 2017. Retrieved from: https://arxiv.org/abs/1702.01731.

L. Bertinetto, J. Valmadre, J. F. Henriques, A. Vedaldi, and P. H. S. Torr, "Fully-Convolutional Siamese Networks for Object Tracking", Department of Engineering Science, University of Oxford, submitted Jun. 2016, revised Sep. 2016. Retrieved from: https://arxiv.org/abs/1606.09549.

A. Bewley, Z. Ge, L. Ott, F. Ramos, and B. Upcroft, "Simple Online and Realtime Tracking", Queensland University of Technology, University of Sydney, submitted Feb. 2016, revised Jul. 2017. Retrieved from: https://arxiv.org/abs/1602.00763.

D. Comaniciu, V. Ramesh, and P. Meer, "Kernel-Based Object Tracking", IEEE Transactions on Pattern Analysis and Machine Intelligence, 25(5): 564-577, May 2003. Retrieved from: https://pdfs.semanticscholar.org/7e16/50ef97b15a0864372c578303dc1dac3800ef.pdf.

R. Cucchiara, C. Grana, A. Prati, and R. Vezzani, "Probabilistic Posture Classification for Human-Behavior Analysis", IEEE Transactions on Systems, Man, and Cybernetics-Part A, 35(1):42-54, Jan. 2005. Retrieved from: http://citeseerx.ist.psu.edu/viewdock/download?doi=10.1.1.453.8805&rep=rep1&type=pdf.

J. Donahue, L. A. Hendricks, S. Guadarrama, M. Rohrbach, S. Venugopalan, K. Saenko, and T. Darrell, "Long-term Recurrent Convolutional Networks for Visual Recognition and Description", submitted Nov. 2014, revised May 2016. Retrieved from: https://arxiv.org/abs/1411.4389.

R. B. Girshick, "Fast R-CNN", Microsoft Research, submitted Apr. 2015, revised Sep. 2015. Retrieved from: https://arxiv.org/abs/1504.08083.

R. B. Girshick, J. Donahue, T. Darrell, and J. Malik, "Rich feature hierarchies for accurate object detection and semantic segmentation", UC Berkeley, submitted Nov. 2013, revised Oct. 2014. Retrieved from: https://arxiv.org/abs/1311.2524.

M. Hasan and A. K. Roy-Chowdhury, "Context Aware Active Learning of Activity Recognition Models", 2015 Proceedings of the IEEE International Conference on Computer Vision, pp. 4543-4551, 2015. Retrieved from: https://www.cv-foundation.org/openaccess/content_iccv_2015/papers/Hasan_Context_Aware_Active_ICCV_2015_paper.pdf.

K. He, X. Zhang, S. Ren, and J. Sun, "Deep Residual Learning for Image Recognition", Microsoft Research, Dec. 2015. Retrieved from: https://arxiv.org/abs/1512.03385.

J. Heikkilä and O. Silvén, "A Real-Time System for Monitoring of Cyclists and Pedestrians", Proceedings Second IEEE Workshop on Visual Surveillance (VS'99), Jun. 1999. Retrieved from: http://www.ee.oulu.fi/mvg/giva/motion/pcounter.pdf.

D. Held et al., "Learning to track at 100 FPS with deep regression networks", submitted Apr. 2015, revised Aug. 2016. Retrieved from: https://arxiv.org/abs/1604.01802.

A. G. Howard et al., "MobileNets: Efficient Convolutional Neural Networks for Mobile Vision Applications", Google Inc., Apr. 2017. Retrieved from: https://arxiv.org/abs/1704.04861.

J. Huang et al., "Speed/accuracy trade-offs for modem convolutional object detectors", Google Research, submitted Nov. 2016, revised Apr. 2017. Retrieved from: https://arxiv.org/abs/1611.10012.

F. N. Iandola et al., "SqueezeNet: AlexNet-level accuracy with 50x fewer parameters and <0.5MB model size", DeepScale & UC Berkeley, Stanford University, submitted Feb. 2016, revised Nov. 2016. Retrieved from: https://arxiv.org/abs/1602.07360.

D. Kang et al., "NoScope: Optimizing Neural Network Queries over Video at Scale", Stanford InfoLab, submitted Mar. 2017, revised Aug. 2017 Retrieved from: https://arxiv.org/abs/1703.02529.

W. Liu et al., "SSD: Single Shot MultiBox Detector", submitted Dec. 2015, revised Dec. 2016. Retrieved from: https://arxiv.org/pdf/1512.02325.pdf.

L. Nan et al., "An Improved Motion Detection Method for Real-Time Surveillance", IAENG International Journal of Computer Science, 35(1), Feb. 2008. Retrieved from: https://pdfs.semanticscholar.org/b47c/e6112b2ca7d5b59d873cac4bf111e2914d72.pdf?_ga=2.162066748.1257216866.1543429854-1092513958.1543429854.

P. Ondruska and I. Posner, "Deep Tracking: Seeing Beyond Seeing Using Recurrent Neural Networks", presented at AAAI-16 Conference, Feb. 2016. Retrieved from: https://arxiv.org/abs/1602.00991.

J. Redmon et al., "You Only Look Once: Unified, Real-Time Object Detection", submitted Jun. 2015, revised May 2016. Retrieved from: https://arxiv.org/abs/1506.02640.

J. Redmon and A. Farhadi, "YOLO9000: Better, Faster, Strong", Dec. 2016. Retrieved from: https://arxiv.org/abs/1612.08242.

S. Ren et al., "Faster R-CNN: Towards Real-Time Object Detection with Region Proposal Networks" In Advances in Neural Information Processing Systems 28, Curran Associates, Inc., 2015. Retrieved from: https://papers.nips.cc/paper/5638-faster-r-cnn-towards-real-time-object-detection-with-region-proposal-networks.

W. Shuigen et al., "Motion Detection Based on Temporal Difference Method and Optical Flow field", 2009 Second International Symposium on Electronic Commerce and Security, pp. 85-88. Retrieved from IEEE.

K. Simonyan and A. Zisserman, "Two-Stream Convolutional Networks for Action Recognition in Videos", Visual Geometry Group, University of Oxfrod, submitted Jun. 2014, revised Nov. 2014. Retrieved from: https://arxiv.org/abs/1406.2199.

A. Sobral and I. Bouwmans, "BGS Library: A Library Framework for Algorithm's Evaluation in Foreground/Background Segmentation" in Background Modeling and Foreground Detection for Video Surveillance: Traditional and Recent Approaches, Implementations, Benchmarking and Evaluation, CRC Press, Taylor and Francis Group, Jul. 2014. Retrieved from: https://www.researchgate.net/publication/259574448_BGS_Library_A_Library_Framework_for_Algorithm's_Evaluation_in_ForegroundBackground.

C. Stauffer and W. E. L. Grimson, "Adaptive background mixture models for real-time tracking", in CVPR, pp. 2246-2252, IEEE Computer Society, 1999. Retrieved from: http://www.ai.mit.edu/projects/vsam/Publications/stauffer_cvpr98_track.pdf.

C. Szegedy et al., "Rethinking the Inception Architecture for Computer Vision", Dec. 2015. Retrieved from: https://arxiv.org/abs/1512.00567.

D. Tran et al., "C3D: Generic Features for Video Analysis", Dec. 2014. Retrieved from: https://arxiv.org/abs/1412.0767v1.

M. Wang, B. Ni, and X. Yang, "Recurrent Modeling of Interaction Context for Collective Activity Recognition", in the IEEE Conference on Computer Vision and Pattern Recognition (CVPR), Jul. 2017. Retrieved from: http://openaccess.thecvf.com/content_cvpr_2017/papers/Wang_Recurrent_Modeling_of_CVPR_2017_paper.pdf.

Y. Wang et al., "CDnet 2014: An Expanded Change Detection Benchmark Dataset", in Proc. IEEE Workshop on Change Detection (CDW-2014) at CVPR-2014, pp. 387-394, 2014. Retrieved from: http://openaccess.thecvf.com/content_cvpr_workshops_2014/W12/papers/Wang_CDnet_2014_An_2014_CVPR_paper.pdf.

C. Wren et al., "Pfinder: Real-time tracking of the human body", IEEE Transactions on Pattern Analysis and Machine Intelligence, 19:780-785, 1997.

D. P. Kingma and J. Ba. Adam: A method for stochastic optimization. CoRR, abs/1412.6980, 2014.

C. Szegedy, W. Liu, Y. Jia, P. Sermanet, S. E. Reed, D. Anguelov, D. Erhan, V. Vanhoucke, and A. Rabinovich. Going deeper with convolutions. CoRR, abs/1409.4842, 2014.

(56) References Cited

OTHER PUBLICATIONS

B. Wu, F. Iandola, P. H. Jin, and K. Keutzer. Squeezedet: Unified, small, low power fully convolutional neural networks or real-time object detection for autonomous driving. In the IEEE Conference on Computer Vision and Pattern Recognition (CVPR) Workshops, Jul. 2017.

P. Xu, M. Ye, X. Li, Q. Liu, Y. Yang, and J. Ding. Dynamic background learning through deep auto-encoder networks. In Proceedings of the 22Nd ACM International Conference on Multimedia, MM '14, pp. 107-116, New York, NY, USA, 2014. ACM.

R. Y. D. Xu, J. G. Allen, and J. S. Jin. Robust real-time tracking of non-rigid objects. In Proceedings of the Pan-Sydney Area Workshop on Visual Information Processing, VIP '05, pp. 95-98, Darlinghurst, Australia, Australia, 2004. Australian Computer Society, Inc.

R. Yu, X. Chen, V. I. Morariu, and L S. Davis. The role of context selection in object detection. In British Machine Vision Conference (BMVC), 2016.

Z. Zivkovic. Improved adaptive gaussian mixture model for background subtraction. In Proceedings of the Pattern Recognition, 17th International Conference on (ICPR'04) vol. 2-vol. 02, ICPR '04, pp. 28-31, Washington, DC, USA, 2004. IEEE Computer Society.

Lan, Y., Ji, Z., Gao, J. and Wang, Y., May 2014. Robot fish detection based on a combination method of three-frame-difference and background subtraction. In the 26th Chinese Control and Decision Conference (2014 CCDC) (pp. 3905-3909). IEEE.

Gupta, P., Singh, Y. and Gupt, M., 2014. Moving object detection using frame difference, background subtraction and sobs for video surveillance application. In the Proceedings of the 3rd International Conference System Modeling and Advancement in Research Trends.

Hussain, Z., Naaz, A. and Uddin, N., 2016. Moving object detection based on background subtraction and frame differencing technique. International Journal of Advanced Research in Computer and Communication Engineering, 5 (13), pp. 817-819.

Zhang, Y., Wang, X. and Qu, B., 2012. Three-frame difference algorithm research based on mathematical morphology. Procedia Engineering, 29, pp. 2705-2709.

Open CV, Wikipedia, retrieved from https://en.wikipedia.org/wiki/OpenCV on Jul. 9, 2020.

How to Use Background Subtraction Methods, docs.OpenCV.org, retrieved from https://docs.opencv.org/master/d1/dc5/tutorial_background_subtraction.html#:~:text=OpenCV%3A%20How%20to%20Use%20Background%20Subtraction%20Methods&text=Background%20subtraction%20(BS)%20is%20a,scene)%20by%20using%20static%20cameras on Jul. 9, 2020.

Background Subtraction, Open CV-Python Tutorials, retrieved from https://opencv-python-tutroals.readthedocs.io/en/latest/py_tutorials/py_video/py_bg_subtraction/py_bg_subtraction.html on Jul. 9, 2020.

Python | Background subtraction using Open CV, GeeksforGeeks, retrieved from https://www.geeksforgeeks.org/python-background-subtraction-using-opencv/ on Jul. 9, 2020.

A Beginner's Guide to Convolutional Neural Networks (CNNs), Skymind, retrieved from https://skymind.ai/wiki/convolutional-network on Aug. 20, 2019.

\* cited by examiner

RELEVANT MOTION DETECTION IN VIDEO

CROSS-REFERENCE TO RELATED APPLICATION

This application claims priority to U.S. Provisional Patent Application No. 62/555,501, filed on Sep. 7, 2017, the entirety of which is hereby incorporated by reference.

BACKGROUND

Various systems, such as security systems, may be used to detect relevant motion of various objects (e.g., cars, delivery trucks, school buses, etc.) in a series of captured images and/or video while screening out nuisance motions caused by noise (e.g., rain, snow, trees, flags, shadow, change of lighting conditions, reflection, certain animals such as squirrels, birds, other animals, and/or pets in some cases, etc.). Such systems allow review relevant motion while, at the same time, avoiding the need to review motion or events that are irrelevant.

SUMMARY

The following summary presents a simplified summary of certain features. The summary is not an extensive overview and is not intended to identify key or critical elements.

Methods, systems, and apparatuses are described for detecting relevant motion in a series of captured images or video. As described herein input data based on a plurality of captured images and/or video is received. The input data may then be pre-processed to generate pre-processed input data. For example, pre-processing may include one or more of generating a 4D tensor from the input data, down-sampling the input data, conducting background subtraction, and object identification. A first convolution on the pre-processed input data may be performed. The first convolution may include a spatial-temporal convolution with spatial-wise max pooling. A second convolution may be performed on the intermediate data. The second convolution may comprise a spatial-temporal convolution with temporal-wise max pooling. Based on the second convolution, the methods, systems, and apparatuses described herein may generate predictions of relevant motion.

These and other features and advantages are described in greater detail below.

BRIEF DESCRIPTION OF THE DRAWINGS

Some features are shown by way of example, and not by limitation in the accompanying drawings. In the drawings, like numerals reference similar elements.

DETAILED DESCRIPTION

Figure 1:
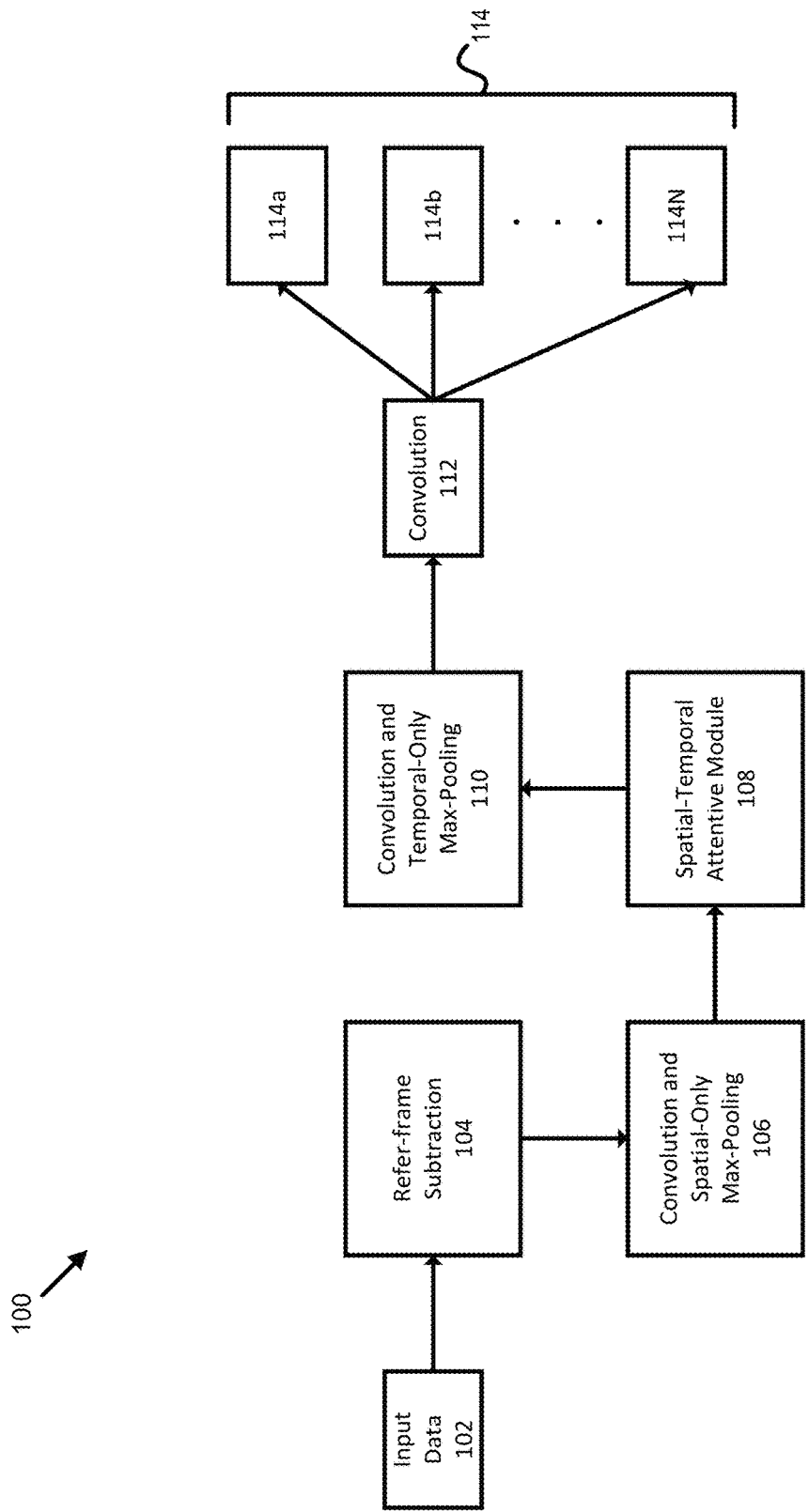
FIG. 1 shows an example of a system that can detect relevant motion.

Surveillance cameras may be installed to monitor facilities for security and safety purposes. Some systems perform motion detection using surveillance cameras and show the detected motion events (usually in short video clips of, e.g., 15 seconds or so) to a user for review on a computing device over, e.g., the web and/or a mobile network.

Motion detection may be a challenging problem. Many nuisance alarm sources, such as tree motion, shadow, reflections, rain/snow, and flags (to name several non-limiting examples), may result in many irrelevant motion events. Security and/or surveillance systems that respond to nuisance alarm sources may produce results (e.g., video clips and/or images) that are not relevant to a user's needs.

Relevant motion event detection, on the other hand, may be responsive to a user's needs. Relevant motion may involve pre-specified relevant objects, such as people, vehicles and pets. For example it may be desirable to identify objects having human recognizable location changes in a series of captured images and/or video if, e.g., users do not care about stationary objects, e.g., cars parked on the street. Removing nuisance events may reduce the need to review "false alarms" and also help in supporting other applications such as semantic video search and video summarization.

Security and/or surveillance systems may use surveillance cameras. Surveillance cameras may be configured to capture images over extended periods of time (e.g., at night, while an owner is away, or continuously). The size of files storing captured images (e.g., video data) may be quite large. To address this issue, some motion detectors perform background subtraction, and object detection and tracking on each frame of a video, which may be time-consuming and require extensive processing power and demand. This may sometimes require, e.g., powerful and expensive graphical processing units (GPUs).

Cost and/or processing requirements may be reduced by detecting interesting/relevant motion from surveillance videos efficiently. Additionally, some, part, substantially all, and/or all of a series of captured images and/or video may be used. The video may be processed by using a sampling technique (e.g., down-sampling such as spatial and/or temporal down-sampling) and/or by one or more other processing algorithms. The processed video and/or unprocessed video may be used to detect and/or categorize motion in the video. Hundreds of videos per second on a GPU may be parsed. Indeed, it is possible to take less than about 1 second, e.g., less than 0.5 second to parse a video on a CPU, while achieving excellent detection performance. Detecting relevant motion caused by objects of interest may comprise a number of separate steps. A step may comprise of detecting moving objects. This step may also include, a background subtraction process that may be performed on a suitable device (e.g., a local device such as a camera, set top box, and/or security system). A step may comprise filtering out nuisance motion events (e.g., trees, cloud, shadow, rain/ snow, flag, pets, etc.). This step may be performed with deep learning based object detection and tracking processes that are performed on a separate system such as a remote system (e.g., in a centralized location such as a headend and/or in the cloud). It can be helpful to utilize an end-to-end system, method, and apparatus that unifies the multiple steps and leverages the spatial-temporal redundancies with the video.

A methods of detecting interesting/relevant motion may comprise one or more of (1) background subtraction in a sequence of images; (2) object detection; (3) video tracking; and/or (4) video activity recognition, for example, using a 3D convolutional network, to name a few non-limiting examples.

Background subtraction may include, for example, background subtraction in video frames using one or more masks (e.g. a foreground mask) associated with one or more moving objects. The masks may be utilized in conjunction with the images of the series of captured images and/or frames of video by using them in background subtraction. In some examples, relevant motion detection may be enhanced by performing a background subtraction to pre-process images (e.g., video frames) to filter out some or all of images without substantial and/or relevant motion.

Object detection may be employed to localize and/or recognize objects in one or more images. Object detection may be based on deep learning based methods. The object detection methods may use one or more images as the input of a deep network and produce various outputs such as bounding boxes and/or categories of objects. To the extent motion from relevant objects is desirable, it may be desirable to utilize one or more object detection processes may be used to filter out non-relevant motion.

Video tracking may be used to identify and/or localize objects (e.g., moving objects) over time. To detect moving objects one or more video tracker(s) may be used. The one or more video trackers may operate on the images and/or processed images (such as the detection results) to detect objections by, e.g., determining whether one or more objects in the images and/or pre-processed images comprises a valid true positive moving object. Where the one or more video trackers detect a valid overlap with the detection results for several frames and/or where one or more video trackers detects that there may be some displacement of one or more objects that meets a threshold, a positive video tracking result may be indicated. In other circumstances, e.g., where there is no tracker overlap with the detection results and/or there is very small displacement of the object, e.g., that does not meet a threshold, then there may be a negative video tracking result. Video activity recognition may be used and may be configured to recognize the actions and/or goals of one or more agents (e.g., person) from the observations in images such as a video. Videos may be differentiated with or without relevant substantial motion. For example, video activity recognition may different fine-grained activity categories from videos that have more substantial motion such as other than fine-grained activity.

A 3D convolutional network may be used in video activity recognition. For example, the 3D convolutional network may use several frames, e.g., as the input of the network, and/or may perform convolution operations spatially and/or temporally which may result in modelling the appearance and/or motion of frames overtime.

Images (e.g., all and/or part of a video) may be parsed at any suitable interval (e.g., over frames, fragments, segments, and/or all at once) and/or detect relevant motion of the images with a very compact and/or efficient methods that, for example, employ a deep learning framework. It may be desirable to down-sample the images (e.g., spatially (reduce the video resolution) and/or temporally (e.g., subsample limited frames uniformly from the video). The processed images may be utilized to construct a 4D tensor of the down-sampled video. The 4D tensor may be variously used as, for example, the input of a neural network, such as a 3D convolutional neural network. The output of the neural network may be variously configured such as comprising one or more binary predictions. These predictions may include, for example, whether there is any relevant motion in the video and/or whether the motion is caused by person/vehicles/pets and so on.

To highlight movement in the foreground of a video, the 4D tensor may be preprocessed by subtracting the previous frame for each time stamp. Multi-task learning may be employed to differentiate the motion of different objects (e.g., person and vehicles) to not only predict the presence of motion, but to also predict the spatial and temporal positions of that motion. Additionally, the predicted spatial-temporal positions of the motion as a soft attention may be used to scale different features. This may result in better awareness of the spatial-temporal positions of the moving objects.

FIG. 1 is a functional block diagram showing a system 100 for detecting relevant motion in input data 102 (e.g., one or more image frames or video) according one or more methods described herein. The system 100 may include a reference-frame subtraction module 104, a convolutional module with spatial-only max-pooling 106, a spatial-temporal attentive module 108, a convolutional module with temporal-only max-pooling 110, and a convolution module 112.

The reference-frame subtraction module 104 may operate on input data 102. Input data 102 may comprise video that has been spatially-temporally down sampled in various examples. The reference-frame subtraction module 104 may be operated on a 4D tensor input. The reference-frame subtraction module 104 may be configured to subtract a previous frame for each frame of the 4D tensor in order to highlight movement in the foreground.

The system 100 may also include one or more spatial-only max-pooling modules. The spatial-only max-pooling module 106 may be configured to use several 3D convolutional layers to extract both appearance and motion related features, and optionally only conduct max-pooling spatially to reduce the spatial size but keep the temporal size unchanged. This may be useful in, for example, systems that require the number of frames to remain unchanged in order to support a spatial-temporal attentive module such a spatial-temporal attentive module 108.

The system 100 may include one or more spatial-temporal attentive modules such as spatial-temporal attentive module 108. The spatial-temporal attentive module 108 may be configured to introduce multi-task learning and attentive model in a framework used by system 100. For example, the spatial-temporal attentive module 108 may use a 3D convolutional layer to predict a probability of there being some moving objects of interest at each spatial-temporal location. One or more predicted probability matrices may be used to scale the extracted features. Using one or more predicated probability matrices may result in more awareness of moving objects.

The temporal-only max-pooling module 110 may be configured to predict the video-wise labels of relevant motion needed to combine the information from all frames. Features from different frames may be abstracted by several 3D convolutional layers and max-pooling conducted temporally (the appearance-based features are abstracted via spatial max-pooling in the earlier layers, so spatial size may be kept unchanged for these layers).

The convolution module 112 may be configured to perform 1×1 convolution. However, the convolution module need not be so limited—indeed any suitable form of convolution may be employed. If the convolution module 112 employs 1×1 convolution, after the temporal-only max-pooling, the temporal length of the output tensor may be 1. The convolution module may then conduct a global-average pooling to reduce the spatial size to 1. The convolution module 112 may conduct 1×1 convolution on the output tensor to produce several binary predictions 114a, 114b, 114N (collectively "114") of relevant motion of the video. By using the fully-convolutional 3D convolution network, the spatial-temporal redundancies in the surveillance video data may be leveraged to efficiently pinpoint to the object of interest and its motion.

Figure 2:
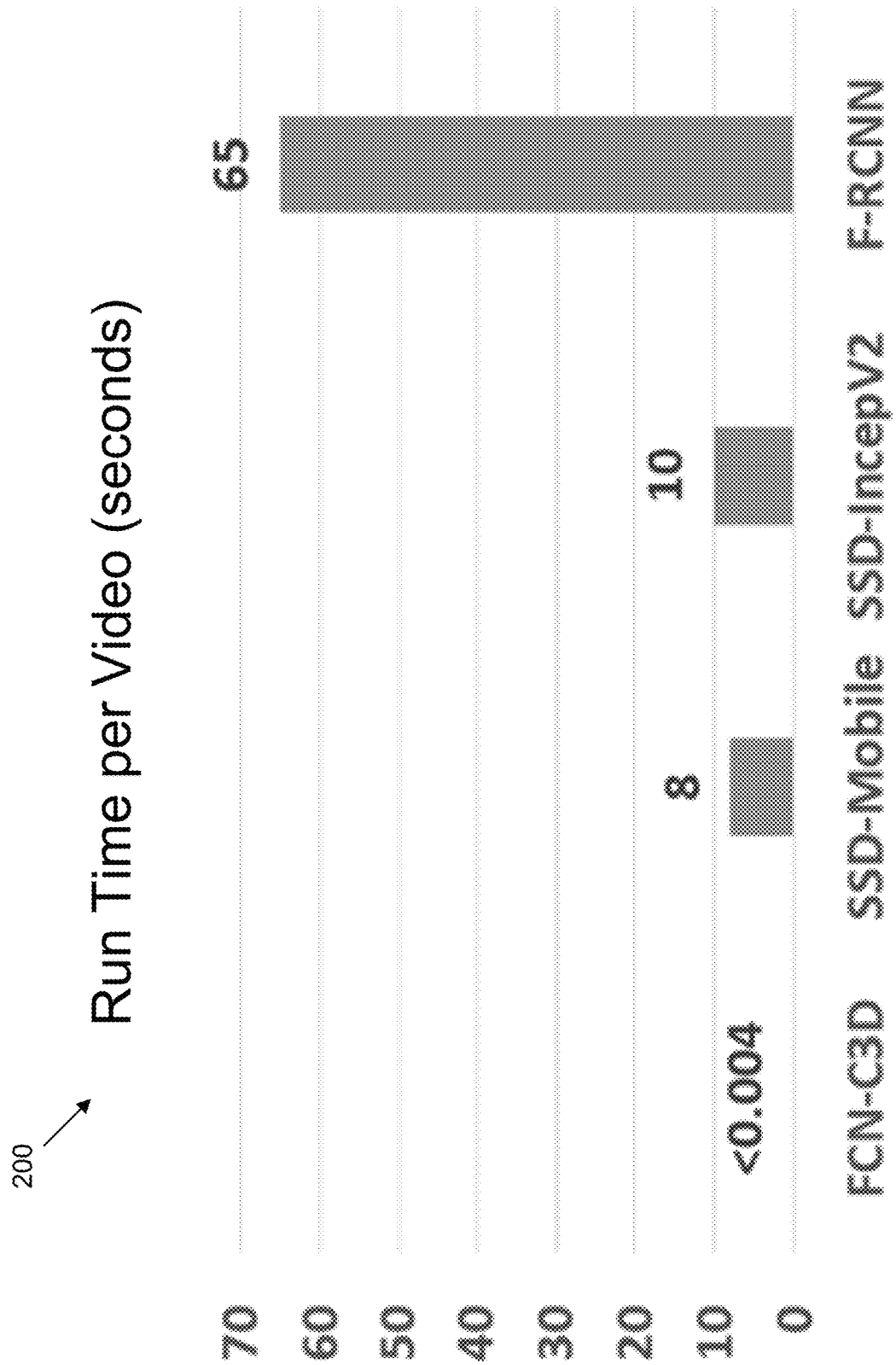
FIG. 2 is a graph of the run time per video (in seconds) of systems.
Figure 3:
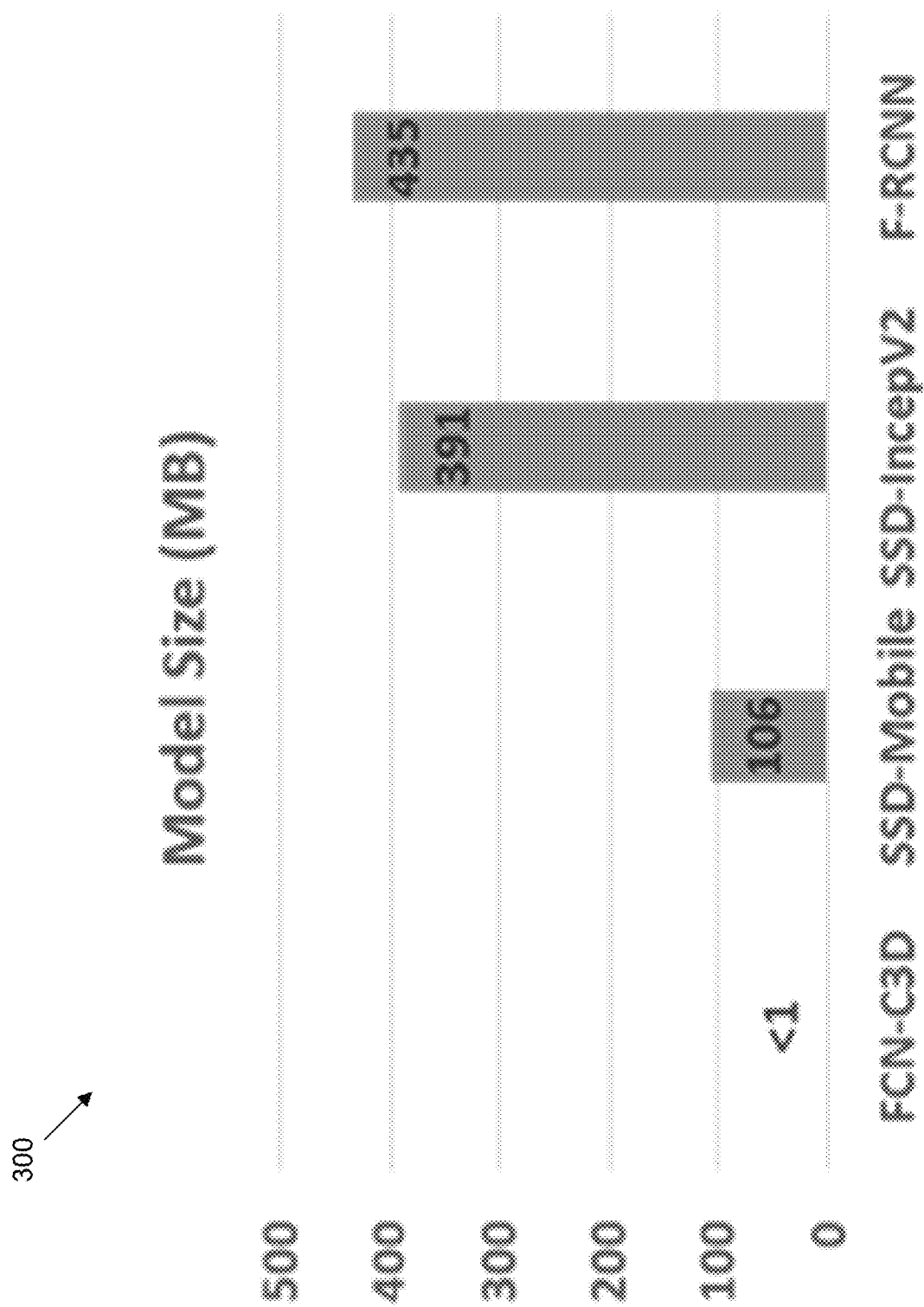
FIG. 3 is a graph of model size in megabytes of example systems.

Less than about 0.5 seconds on a CPU (e.g., Intel Xeon E5-2650 @2.00 GHz), e.g., 0.004 seconds or less may be required to analyze a 15 second video on a GPU (e.g., a GTX 1080 GPU in some examples). Because the network may be fully-convolutional, the network may be light weight and compact. The model size might be less than 1 MB. FIGS. 2 and 3 are graphs depicting time and model size benchmarking for various methods and detection baselines. For example, FIG. 2 is a graph 200 that depicts the run time per video in seconds. FIG. 3 is a graph 300 that depicts the model size associated with various methods described herein and baselines in megabytes.

Figure 4:
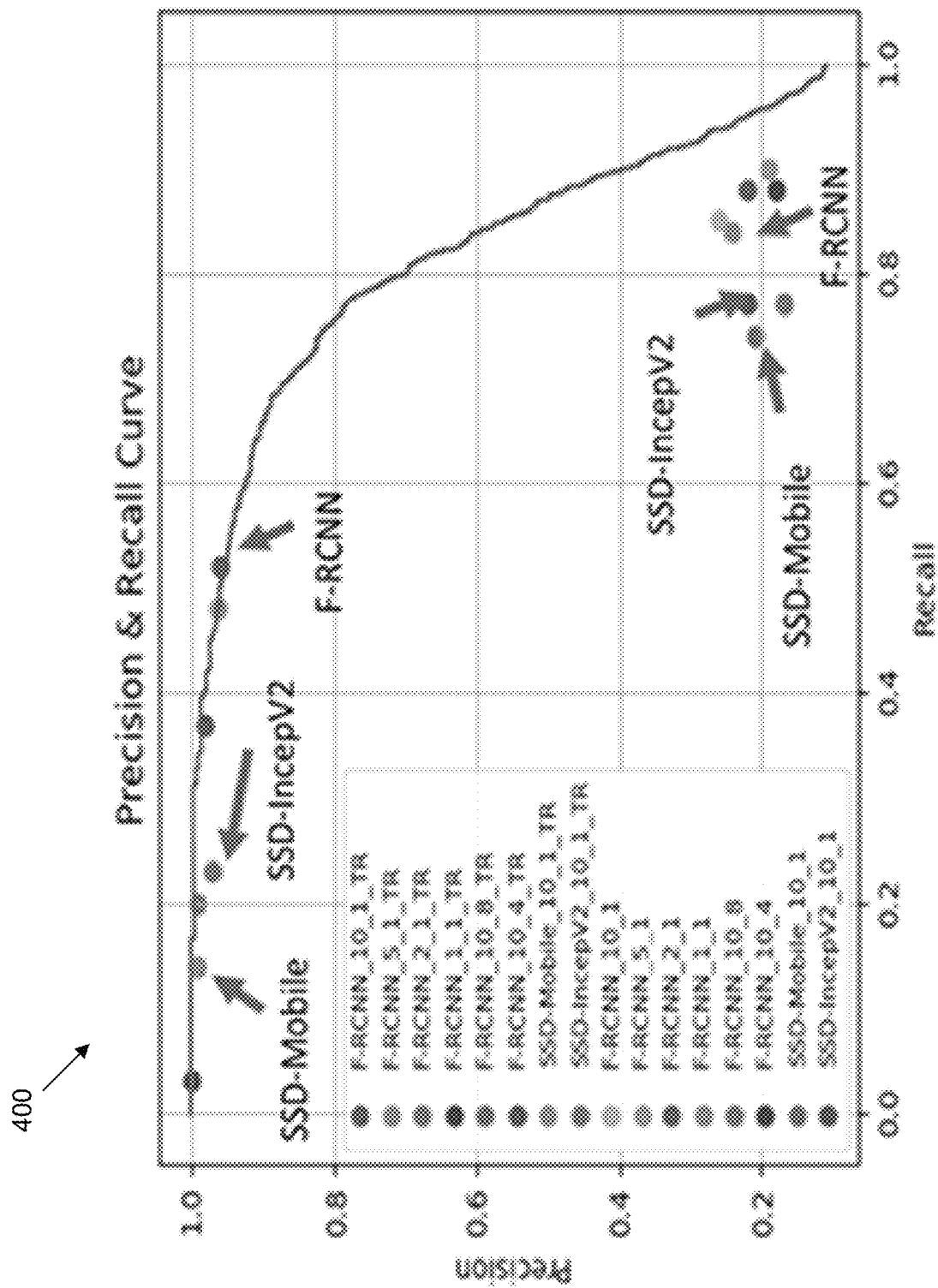
FIG. 4 is a graph of a performance comparison of various example systems.

An end-to-end data-driven method for detecting relevant motion may be used. Such method need not require additional data annotations. Methods that may be trained by the detection results of the object detection baseline, but that may outperform the detection method, may be used. FIG. 4 is a graph 400 depicting a performance comparison of relevant motion detection between the certain methods disclosed herein (the curve) and detection baselines (the solid dots; each dot represents a detection method with different detector, frames per second (FPS), spatial resolution reduction rate, and with/without performing tracking as a post-processing step). As shown in FIG. 4, various methods disclosed herein can achieve better motion detection performance than the object detection baselines (the dots that are either below or close to the curve).

Figure 5:
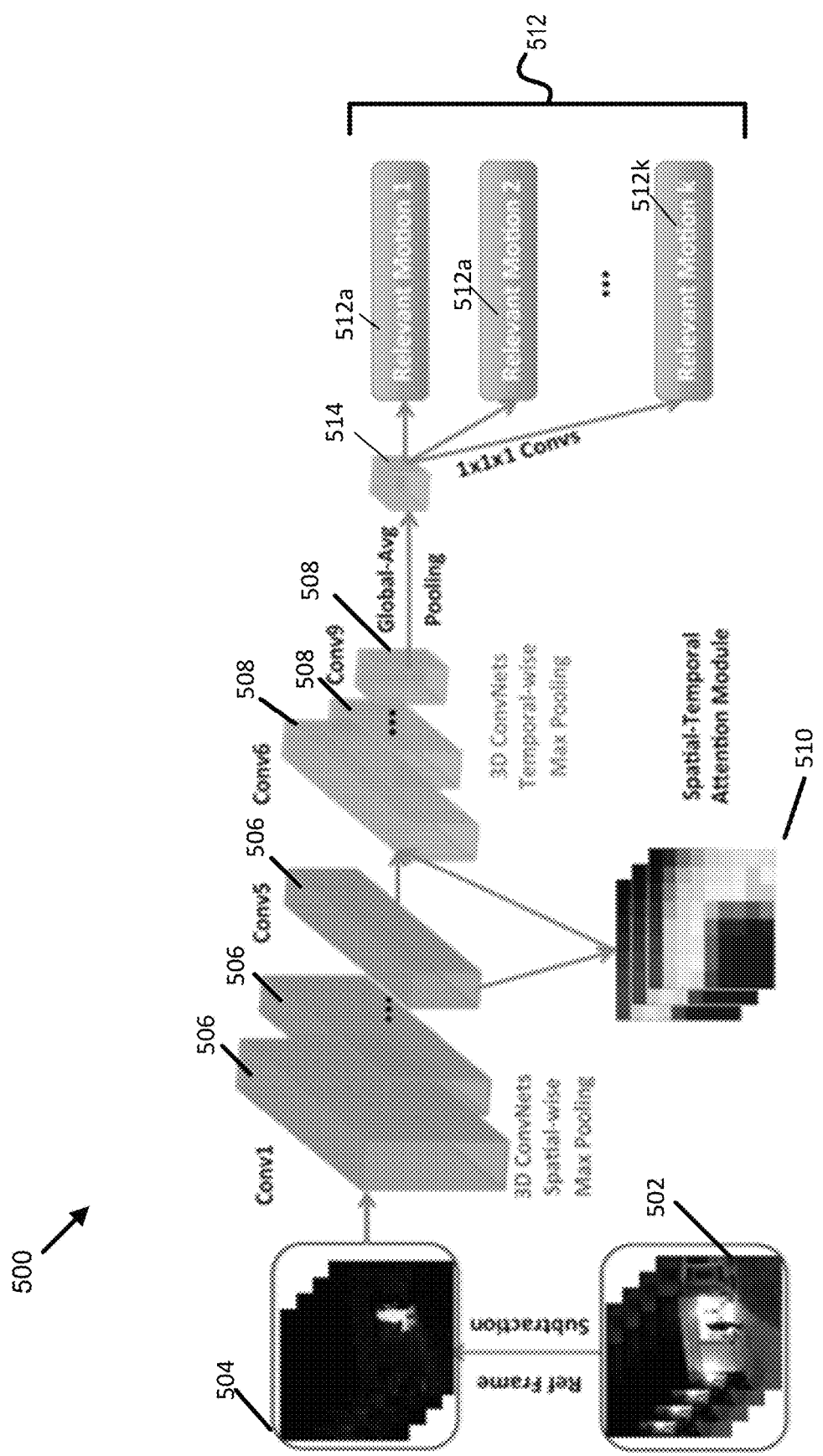
FIG. 5 shows an example of a system that can detect relevant motion.

The various examples described herein, may dramatically increase the speed of relevant motion event detection and improve performance by use of a network for relevant motion event detection (ReMotENet). FIG. 5 shows an example of a ReMotENet 500. The ReMotENet 500 may comprise an end-to-end data-driven method using Spatial-temporal Attention-based 3D ConvNets (e.g., 3D ConvNets 506 and 508) to jointly model the appearance and motion of objects-of-interest in a video. The ReMotENet 500 may be configured to parse an entire video clip in one forward pass of a neural network to achieve significant increase in speed. The ReMotENet 500 may be configured to exploit properties of captured images (e.g., video) from surveillance systems. The relevant motion may be sparse both spatially and temporally. The ReMotENet 500 may then also be configured to enhance 3D ConvNets with a spatial-temporal attention model and reference-frame subtraction to encourage the network to focus on the relevant moving objects. Experiments demonstrate that one or more method described herein may achieve excellent performance compared with object detection based methods (e.g., at least three to four orders of magnitude faster and up to 20 k times on GPU devices examples). The ReMotENet 500 networks may be efficient, compact and light-weight, and may detect relevant motion on a 15 second surveillance video clip within 4-8 milliseconds on a GPU and a fraction of second (e.g., 0.17-0.39 seconds) on a CPU with a model size of less than 1 MB.

One or more object detectors may be used to detect objects. One or more method may comprise applying the object detectors based on deep convolutional neural networks (CNNs) to identify objects of interest. Given a series of images (e.g., a video clip), background subtraction may be applied to each frame to filter out stationary frames. Object detection may then be applied to frames that have motion to identify the categories of moving objects in some examples. Finally, the system (using, e.g., the one or more object detectors) generates trackers on the detection results to filter out temporally inconsistent falsely detected objects or stationary ones.

Object detection based methods may have disadvantages, however Systems that employ object detectors can computationally expensive For example, object detectors may sometimes require the use of expensive GPUs devices and achieve at most 40-60 FPS. When scaling to tens of thousands of motion events coming from millions of cameras, object detector based solutions can become expensive. Object detector based methods may comprise of several separate pre-trained methods or hand-crafted rules, and some such methods may not fully utilize the spatial-temporal information of an entire video clip. For example, moving object categories may be detected mainly by object detection, which may ignore motion patterns that can also be utilized to classify the categories of moving objects.

The ReMotENet 500 may address these issues. In various examples, the ReMotENet 500 may be capable of implementing a unified, end-to-end data-driven method using Spatial-temporal Attention-based 3D ConvNets to jointly model the appearance and motion of objects-of-interest in a video event. The ReMotENet 500 may be configured to parse an entire video clip in one forward pass of a neural network to achieve significant increases in speed (e.g., up to 20 k times faster, in some examples) on a single GPU. This increased performance enables the systems to be easily scalable to detect millions of motion events and reduces latency. Additionally, the properties of home surveillance videos, e.g., relevant motion is sparse both spatially and temporally, may be exploited and enhance 3D ConvNets with a spatial-temporal attention model and reference-frame subtraction to encourage the network to focus on relevant moving objects.

To train and evaluate the various networks (e.g., the ReMotENet 500), a dataset of 38,360 home surveillance video clips of 15 s from 78 cameras covering various scenes, time periods, lighting conditions and weather was collected. Additionally, to avoid the cost of training annotations, training of the networks (e.g., the ReMotENet 500) may be weakly supervised by the results of the object detection based method. For instance, in tests of exemplary instances of the ReMotENet 500, 9,628 video clips were manually annotated with binary labels of relevant motion caused by different objects.

The ReMotENet 500 may achieve increases in performance of three to four orders of magnitude faster (9,514×-19,515×) on a single GPU when compared to the object detection based method. That is, ReMotENet 500 may be efficient, compact and light-weight, and can precisely detect relevant motion and may precisely detect relevant motion contained in a 15 s video in 4-8 milliseconds on a GPU and a fraction of second on a CPU with model size of less than 1 MB.

As discussed above, background subtraction may be used to detect moving objects from a series of images (e.g., videos). Background subtraction may utilize frame difference, mean or median filters, a single or mixture Gaussian model, and/or neural networks to segment moving foreground objects. However, some of these background subtraction methods may lack the ability to recognize the semantic categories of the moving objects. For example, in a home surveillance case, to support more sophisticated queries such as "show me the videos with moving vehicles", it may be necessary to differentiate motion caused by different objects.

Object detection and tracking may also be employed. The development of deep neural networks leads to a significant improvement of object detection and tracking. Considering the detection performance, the object detection framework may be R-CNN based. To provide efficient detectors, YOLO and SSD may be employed to dramatically speedup the detection pipeline with some performance degradation. Meanwhile, compressed and compact CNN architectures may be used in the above detection frameworks to further accelerate the process. To locate moving objects in a video, tracking (traditional and deep network based) may be used. The above methods (especially object detection) usually require GPU devices and are slow when considering large-scale video data.

Video activity recognition may be used to detect and categorize activities (e.g., human, animal, vehicle activities) in videos. To model motion and temporal information in a video, two stream network, long-term recurrent neural network based methods and 3D convolution networks (3D ConvNets) based methods may be used. The disclosed 3D ConvNets may require different capabilities to perform the video activity recognition task due to the applications to which they are applied. First, some 3D ConvNets may only consider broad categories of moving objects, rather than fine-grained categories of the activities. Second, some 3D ConvNets may be used to detect activities lasting for a relatively long period, but they rely on motion captured in very short and sparse videos. Third, due to the large volume of videos, for some 3D ConvNets, small computational cost may have higher priority and be much more important.

Neural network queries may be accesserated over video and may employ a preprocessing to reduce the number of frames needed to be parsed in an object detection based video query system. Frame difference and network models (e.g., compact specialized neural network models) may be used to filter out frames without moving relevant objects to increase the speed of object detection. For instance, some instances of the ReMotENet 500 may comprise an end-to-end solution without object detection. However, it is also possible to include a preprocessing step of object detection. The ReMotENet 500 may also jointly model frames in a video clip. However it is possible to conduct detection independently in a frame by-frame fashion. The ReMotENet 500 may also comprise a unified, end-to-end data-driven model. However, it is also possible to include a combination of several pre-trained models without training on the specific task.

Weak supervision may be used by a motion detection pipeline based on object detection and/or tracking. However, it is also possible to learn general motion and/or appearance patterns of different objects from the noisy labels and use those patterns to recover from mistakes made by the detection pipeline. However, since it is possible to only include a pre-processing step before the object detection, they highly rely on the performance of pre-trained object detector, which can be unreliable, especially on home surveillance videos with low video quality, lighting changes and various weather conditions. Forth, sometimes evaluation may occur with unreliable object detection results. On the other hand, ReMotENet 500 may be more convincingly evaluated with human annotations. Fifth, when the run-time speed increase is greater than about 100×, the performance of some examples drops quickly. However, ReMotENet 500 may achieve more than 19,000× speedup while achieving similar or better performance.

FIG. 5 shows the ReMotENet 500. The ReMotENet 500 may include one or more low-level 3D ConvNets 506. The low-level 3D ConvNets 506 may be configured to only abstract spatial features with spatial-wise max pooling. The ReMotENet 500 may also include one or more high-level 3D ConvNets 508 s. The high-level 3D ConvNets 508 may be configured to abstract temporal features using temporal-wise max pooling. A mask (e.g., a spatial-temporal mask) may be employed and multiplied with the extracted features from low-level 3D ConvNet 506 Conv5, e.g., (with Pool 510) before it is fed as the input of high-level 3D ConvNet 508 Conv6. The ConvNets 506 and 508 may be implemented using hardware, software, or some combination thereof.

To support various applications of security and/or surveillance video analysis, it is useful to efficiently detect relevant motion may be used. As discussed above, one solution is to combine one or more of background subtraction, object detection and tracking methods (denoted as "object detection based method"). Object detection based methods require large enough image resolution and FPS to ensure the quality of object detection and tracking, which may lead to large computational cost, especially when using deep learning based object detection methods. It is also possible to employ some hand-crafted and ad-hoc hyper-parameters or thresholds (e.g., the detection confidence threshold and length of valid tracker threshold) to reason the existence of relevant motion in a video clip.

A unified, end-to-end data-driven framework that takes a series of images (e.g., an entire video clip) as the input may be employed to detect relevant motion using 3D ConvNets (e.g., 3D ConvNets 506 and 508). 3D ConvNets 506 and 508 are different from traditional 2D ConvNets that conduct convolution spatially upon an image. That is, the 3D ConvNets 506 and 508 may conduct convolution both spatially and temporally using one or more 3D convolution nets (e.g., 3D ConvNet 506 and 3D ConvNet 508) to jointly extract spatial-temporal features from a sequence of images. One advantage of using 3D ConvNets 506, 508 rather than analyzing the video clip frame-by-frame is that the 3D ConvNets 506, 508 can be configured to parse an entire video clip 502 in one forward pass of a deep network, which is extremely efficient. That is, a 3D ConvNets 506 and 508 may be an end-to-end model that jointly model the appearance of objects and their motion patterns. To fit an entire video in memory the system can be configured to downsample the video frames spatially and/or temporally. It is possible to use an FPS value of 1 to uniformly sample 15 frames from a 15 second video clip, and reduce the resolution by a factor of 8 (from 1280×720 to 160×90). The input tensor of 3D ConvNets 506 and 508 would then be 15×90× 160×3. Experiments demonstrate that unlike the, ReMotE- Net 500 can precisely detect relevant motion 512a, 512b, . . . 512k (collectively "512") with input constructed with small FPS and resolutions.

The context (e.g., a global or local context) of both background objects and/or foreground objects may be used for activity recognition (e.g., some sports can only happen on playgrounds; some collective activities have certain spatial arrangements of the objects that participant). However, since surveillance cameras may capture different scenes at different time with various weathers and lighting conditions, some of the same relevant motion could happen with different background and foreground arrangements. Meanwhile, the appearance of moving relevant objects can be very different even in the same background or foreground arrangement. Since the task is to detect general motion of relevant objects rather than categorizing the activities, the apparatus, systems, and methods described herein may also be capable of suppressing the influence of the distracting background and foreground variance to generalize well.

Accordingly, pre-processing of background subtraction on the 4D input tensor may be employed. In such cases, a previous frame as the "reference-frame" and subtract the reference from each frame may be selected to generate a subtracted 4D tensor 504. The subtracted 4D tensor 504 may be used as an input into 3D ConvNets 506 and 508.

Using reference-frame subtraction, the fine-grained appearance features of the moving objects, such as color and texture, may be suppressed to encourage the network to learn coarse appearance features, e.g., shape and aspect-ratio. One advantage of learning coarse features is that networks (e.g., ReMotENet 500) may be configured to detect motion patterns using frames with low resolution, leading to increased speed.

Most of the video clips captured by, e.g., a home surveillance camera may only contain stationary scenes with irrelevant motion such as shadow, rain and parked vehicles. To detect relevant motion, it is possible to focus only on the moving objects spatially and temporally. To do so, a Spatial-temporal Attention-based (STA) model 510 as shown in FIG. 5 may be used. The STA model 510 may be different from the original 3D ConvNets 506 and 508 (that conducts max pooling both spatially and temporally). Instead, the STA model may obtain an attention mask on each input frame using separate spatial-wise and temporal-wise max pooling as shown in FIG. 5. The ReMotENet 500 may use a 3D ConvNet 506 that first conducts five layers of 3D convolutions (Conv1-Conv5) with spatial-wise max pooling on the 4D input tensor after reference-frame subtraction to abstract the appearance based features. Then, the ReMotE-Net 500 may apply another 3D convolution layer (STA layer) on the output of Pool 510 to obtain a tensor with size 15×3×5×2. Each spatial-temporal location of the output tensor from pool 510 may have a binary prediction of whether our system should pay attention to it. The ReMotE-Net 500 may then conduct a softmax operation on the binary predictions to compute a soft probability of attention for each spatial-temporal location. The output of the attention module may be a probabilistic mask with size 15×3×5×1. The ReMotENet 500 may then duplicate the attention mask across filter channels and apply an element-wise multiplication between the attention mask and the extracted features of Conv5. After that, the ReMotENet 500 may apply four layers of 3D ConvNets (e.g., ConvNets 508) with temporal max pooling to abstract temporal features. When the temporal depth is reduced to 1, a spatial global average pooling (GAP) 514 may be applied to aggregate spatial features, then several 1×1×1 convolution layers with two filters (denoted as "Binary" layers) may be used to predict the final binary results. The use of GAP 514 and 1×1×1 convolutions significantly reduces the number of parameters and model size. The final outputs of the ReMotENet 500 may be several binary predictions indicating whether there is any relevant motion 512 of a certain object or a group of objects. The detailed network structure is shown in Table 1, below. For instance, in experiments on instances of the ReMotENet 500, 16 was chosen as the number of filters cross all convolution layers in the network. For each Conv layer 506, 508, it is possible to use a rectified linear unit (ReLU) as its activation.

TABLE 1

Network Structure of the ReMotENet using Spatialtemporal Attention-based 3D ConvNets

| Layer | Input Size | Kernel Size | Stride | Num of Filters |
|---|---|---|---|---|
| Conv1 | 15 × 90 × 160 × 3 | 3 × 3 × 3 | 1 × 1 × 1 | 16 |
| Pool1 | 15 × 90 × 160 × 3 | 1 × 2 × 2 | 1 × 2 × 2 | — |
| Conv2 | 15 × 45 × 80 × 16 | 3 × 3 × 3 | 1 × 1 × 1 | 16 |
| Pool2 | 15 × 45 × 80 × 16 | 1 × 2 × 2 | 1 × 2 × 2 | — |
| Conv3 | 15 × 23 × 40 × 16 | 3 × 3 × 3 | 1 × 1 × 1 | 16 |
| Pool3 | 15 × 23 × 40 × 16 | 1 × 2 × 2 | 1 × 2 × 2 | — |
| Conv4 | 15 × 12 × 20 × 16 | 3 × 3 × 3 | 1 × 1 × 1 | 16 |
| Pool4 | 15 × 12 × 20 × 16 | 1 × 2 × 2 | 1 × 2 × 2 | — |
| Conv5 | 15 × 6 × 10 × 16 | 3 × 3 × 3 | 1 × 1 × 1 | 16 |
| Pool5 | 15 × 6 × 10 × 16 | 1 × 2 × 2 | 1 × 2 × 2 | — |
| STA | 15 × 3 × 5 × 16 | 3 × 3 × 3 | 1 × 1 × 1 | 2 |
| Conv6 | 15 × 3 × 5 × 16 | 3 × 3 × 3 | 1 × 1 × 1 | 16 |
| Pool6 | 15 × 3 × 5 × 16 | 2 × 2 × 2 | 2 × 2 × 2 | — |
| Conv7 | 8 × 3 × 5 × 16 | 3 × 3 × 3 | 1 × 1 × 1 | 16 |
| Pool7 | 8 × 3 × 5 × 16 | 2 × 2 × 2 | 2 × 2 × 2 | — |
| Conv8 | 4 × 3 × 5 × 16 | 3 × 3 × 3 | 1 × 1 × 1 | 16 |
| Pool8 | 4 × 3 × 5 × 16 | 2 × 2 × 2 | 2 × 2 × 2 | — |
| Conv9 | 2 × 3 × 5 × 16 | 3 × 3 × 3 | 1 × 1 × 1 | 16 |
| Pool9 | 2 × 3 × 5 × 16 | 2 × 2 × 2 | 2 × 2 × 2 | — |
| GAP | 2 × 3 × 5 × 16 | 1 × 3 × 5 | 1 × 1 × 1 | — |
| Binary | 1 × 1 × 1 × 16 | 1 × 1 × 1 | 1 × 1 × 1 | 2 |

A weakly-supervised learning framework that utilizes the pseudo-groundtruth generated from the object detection based method may be adopted. For instance, Faster R-CNN based object detection with FPS 10 may be used and a real-time online tracker applied to capture temporal consistency. Besides binary labels generated from the object detection based method, it is also possible introduce the concept of trainable attention model. Focus on spatial-temporal locations of moving relevant objects to detect motion may be encouraged. Detection confidence scores and bounding boxes of the moving objects obtained from Faster R-CNN can be used as pseudo-groundtruth to compute a cross-entropy loss with the output of STA layer. The loss function of the ReMotENet 500 is expressed in Equation 1, below:

$$\text{loss} = C_1 \sum_n \sum_i w_{n,i} CE(g_{n,i}, y_{n,i}) + \frac{C_2}{W \cdot H \cdot T} \sum_{w,h,t} CE(sta_{w,h,t}, Gsta_{w,h,t})$$

Equation 1

The first part of Equation 1 is the softmax cross-entropy loss (CE) for each relevant motion category defined by a list of relevant objects. The second part of Equation 1 is the mean softmax cross-entropy loss between the predicted attention of each spatial-temporal location produced by "STA" layer and the pseudo-groundtruth obtained from the object detection based method. W, H, T are spatial resolution and temporal length of the responses of layer "STA"; $w_{n,i}$ is the loss weight of nth sample, which is used to balance the biased number of positive and negative training samples for the ith motion category; C1 and C2 are used to balance binary loss and STA loss. C1=1 and C2=0.5 can be chosen.

Video data sets may be used to test ReMotENet 500. For the example a data set comprising 38,360 video clips from 78 home surveillance cameras were used. Examples comprise video data of about 15 seconds long and captured with FPS 10 and 1280×720 resolutions. The videos cover various scenes, such as front door, backyard, street and indoor living room. The longest period a camera recorded is around 3 days, there can be videos of both daytime and night. Those videos mostly capture only stationary background or irrelevant motion caused by shadow, lighting changes or snow/rain. Some of the videos contain relevant motion caused by people and vehicles (car, bus and truck). The relevant motion in the example system was defined with a list of relevant objects. Three kinds of relevant motion were defined: "People motion", caused by object "people"; "Vehicle motion", caused by at least one object from {car, bus, truck}; "P+V Motion" (P+V), caused by at least one object from {people, car, bus, truck}. The detection performance of "P+V Motion" evaluates the ability of our method to detect general motion, and the detection performance of "People/Vehicle motion" evaluates the ability of differentiating motion caused by different kinds of objects.

The outputs of a ReMotENet 500 may comprise binary predictions 512. Based on applying softmax on each binary prediction, probabilities of having people plus vehicle (i.e., P+V) motion, people motion and vehicle motion in a video clip can be obtained. Average Precision can be adopted to evaluate object detection. By default, the input of 3D ConvNets may be a 15×90×160×3 tensor 504 sub-sampled from a 15 second video clip in some instances. The default number of filters per convolution layer may be 16. Different architectures and design choices of our methods were evaluated and report the average precision of detecting P+V motion, people motion and vehicle motion in Table 2, below.

The ReMotENet 500 may comprise a system having a 3D ConvNets with 5 Conv layers followed by spatial-temporal max pooling. A 3×3×3 3D convolution may be conducted with 1×1×1 stride for Conv1-Conv5, and 2×2×2 spatial-temporal max pooling with 2×2×2 stride on Pool2-Pool5. For Pool1, we conduct 1×2×2 spatial max pooling with 1×2×2 stride. Additionally, the ReMotENet 500 may only have one layer of convolution in Conv1-Conv5. Additionally, the ReMotENet 500 may use a global average pooling followed by several 1×1×1 convolution layers after Conv5. The above basic architecture is called "C3D" in Table 2, below.

TABLE 2

| Network structues of ReMotENet | C3D | RefG-C3D | RefL-C3D | RefL-D | RefL-D-MT | RefL-D-STA-NT | RefL-D-STA-T | RefL-D-STA-T-L | RefL-D-STA-T-32 | RefL-D-STA-T-L-32 |
|---|---|---|---|---|---|---|---|---|---|---|
| 3D ConvNets? | ✓ | ✓ | ✓ | ✓ | ✓ | ✓ | ✓ | ✓ | ✓ | ✓ |
| RefG? | | ✓ | | | | | | | | |
| RefL? | | | ✓ | ✓ | ✓ | ✓ | ✓ | ✓ | ✓ | ✓ |
| Deeper network? | | | | ✓ | ✓ | ✓ | ✓ | ✓ | ✓ | ✓ |
| Mufti-taste learning? | | | | | ✓ | ✓ | ✓ | ✓ | ✓ | ✓ |
| ST Attention? | | | | | | ✓ | ✓ | ✓ | ✓ | ✓ |
| Large resolution? | | | | | | | | ✓ | | ✓ |
| More filters? | | | | | | | | | ✓ | ✓ |
| AP: P + V | 77.79 | 81.80 | 82.29 | 83.98 | 84.25 | 48.91 | 86.71 | 85.67 | 87.87 | 86.09 |
| AP: People | 62.25 | 70.68 | 72.21 | 73.60 | 74.41 | 75.82 | 78.95 | 79.78 | 77.92 | 77.54 |
| AP: Vehicle | 66.13 | 69.23 | 73.03 | 73.71 | 74.25 | 75.47 | 77.84 | 76.85 | 76.81 | 76.92 |

Table 2 shows the path from traditional 3D ConvNets to ReMotENet using Spatial-temporal Attention Model. There are two significant performance improvements along the path. The first is from C3D to RefL-C3D: incorporating reference-frame subtraction leads to significant improvement of all three categories; secondly, from RefL-D to RefL-D-STA-T: by applying trainable spatial-temporal attention model, 3D ConvNets achieve much higher average precision for all three motion categories. Other design choices, e.g., larger input resolution (RefL-D-STA-T-L: from 160×90 to 320×180) and more filters per layer (RefL-D-STA-T-32: from 16 to 32) lead to comparable performance.

Figure 6:
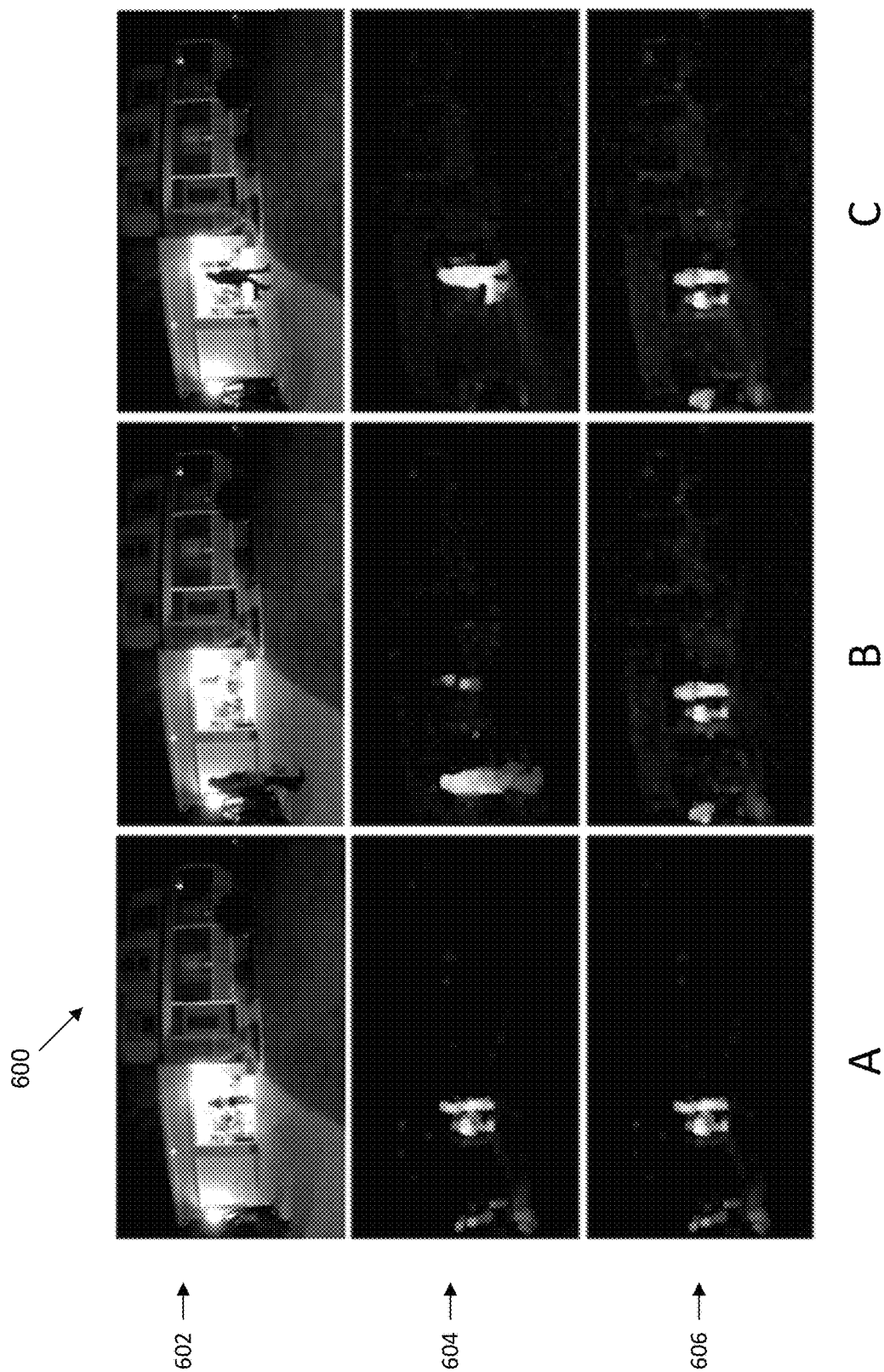
FIG. 6 shows an example of comparisons between different reference frames.

FIG. 6 is a comparison 600 between different reference frames A, B, and C. The first row 602 shows the raw video frames; the second row 604 shows frames after subtracting local reference-frame; third row 606 shows frames after subtracting global reference-frame.

First, the effect of reference frame subtraction in frameworks can be evaluated. Table 2 describes two choices of reference frame: global reference-frame (RefG), which is the first sub-sampled frame of a video clip; local reference-frame (RefL), which is the previous sub-sampled frame of the current frame. Examples of frames subtracted from RefG and RefL are shown in FIG. 6. If there are relevant objects in the first frame, and if the first frame is chosen as the global reference-frame, there will always be holes of those objects in the subsequent frames, which may be misleading for the network. To evaluate the effectiveness of reference frame subtraction, it was incorporated into the basic 3D ConvNets (see C3D in Table 2). From column 2-4 in Table 2, it can be observed that by using either RefG or RefL, 3D ConvNets achieve much higher average precision for all three categories of motion. Using RefL leads to better performance than RefG, especially on people and vehicle motion detection task. For the following experiments, RefL was adopted as a reference-frame.

Figure 7:
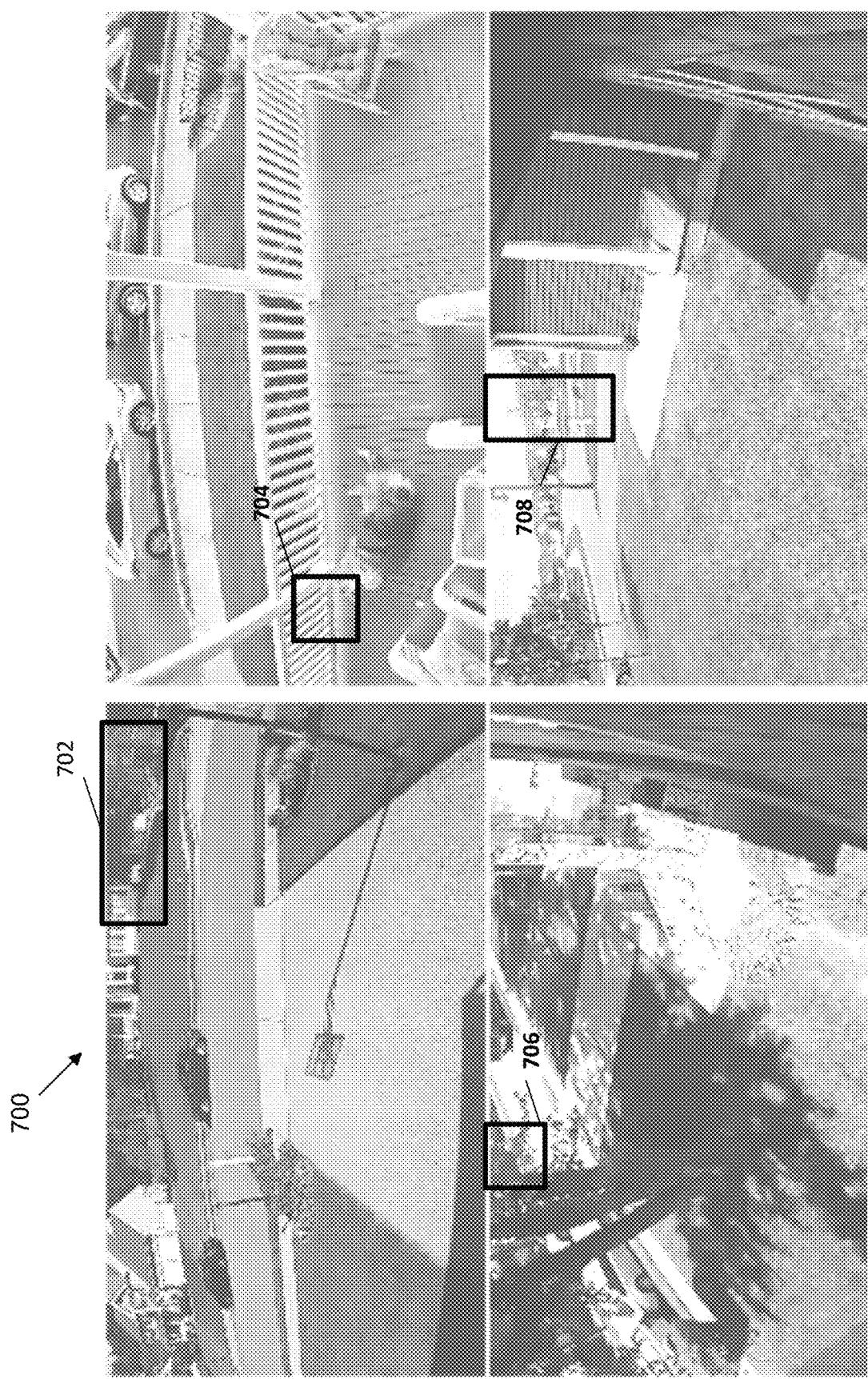
FIG. 7 shows an example of results of example systems for detecting relevant motion.

FIG. 7 depicts Predicted Attention Mask of "RefL-D-STA-NT" 700. Without pseudo-groundtruth bounding boxes of the semantic moving relevant objects obtained from the object detection based method, the attention model will focus on some "irrelevant" motion caused by the objects outside the pre-specified relevant object list, e.g., pets, tree and flags. The boxes 702, 704, 706, and 708 indicate the predicted motion masks (has probability >0.9).

To evaluate the effect of the ReMotENet 500, the basic C3D network architecture to be deeper as shown in Table 1 can be modified. The ReMotENet 500 may have nine 3D ConvNets 506, 508 (without the STA layer in Table 1) as "RefLD". It is also possible to employ another architecture "RefL-D-MT", which uses multi-task learning. In RefL-D-MT, the STA layer is used to predict the ST attention mask, and compute cross-entropy loss with the pseudo-groundtruth obtained from the object detection based method, but we do not multiply the attention mask with the extracted features after the pool 510 in a soft attention fashion. Another model that may be employed is "RefL-D-STA-NT." The STA layer may be applied to predict the attention mask, and multiply the mask with the extracted features after the pool 510 layer. However, for this model, the STA layer can be trained with only binary labels of motion categories rather than detection pseudo-groundtruth. Incorporating multi-task learning and end-to-end attention model individually leads to small improvement. But by combining both methods, the "RefL-DSTA-T" model may achieve significant improvement. Adding multi-task learning alone does not directly affect the final prediction. Meanwhile, considering the sparsity of moving objects in the videos, the number of positive and negative spatial-temporal location from the detection pseudo-groundtruth is extremely biased. Additionally, the "RefL-D-MT" model, may easily over fit to predict the attention of all the spatial-temporal location as 0. On the other hand, adding attention model without multi-task learning also leads to slight improvement. Without the weak supervision of specific objects and their locations, the attention mask predicted by "RefL-D-STA-NT" may focus on motion caused by some irrelevant objects, such as pets, trees and flags shown in FIG. 7. To encourage the ReMotENet 500 to pay attention to the relevant objects (e.g., people and vehicles), the "RefL-D-STAT" model can be used, which can be viewed as a combination of multi-task learning and attention model. Detected bounding boxes can be used to train STA layer, and multiply the predicted attention mask of STA layer with the extracted features from pool 510 layer. "RefL-D-STA-T" achieves much higher average precision than the previous models in all three categories.

More filters in each convolution layer, or enlarge the input resolution from 160×90 to 320×180 may be added. As shown in Table 2, those design choices may lead to insignificant improvements. Experiments demonstrate that the ReMotENet 500 may precisely detect relevant motion with small input FPS and resolution.

Figure 8:
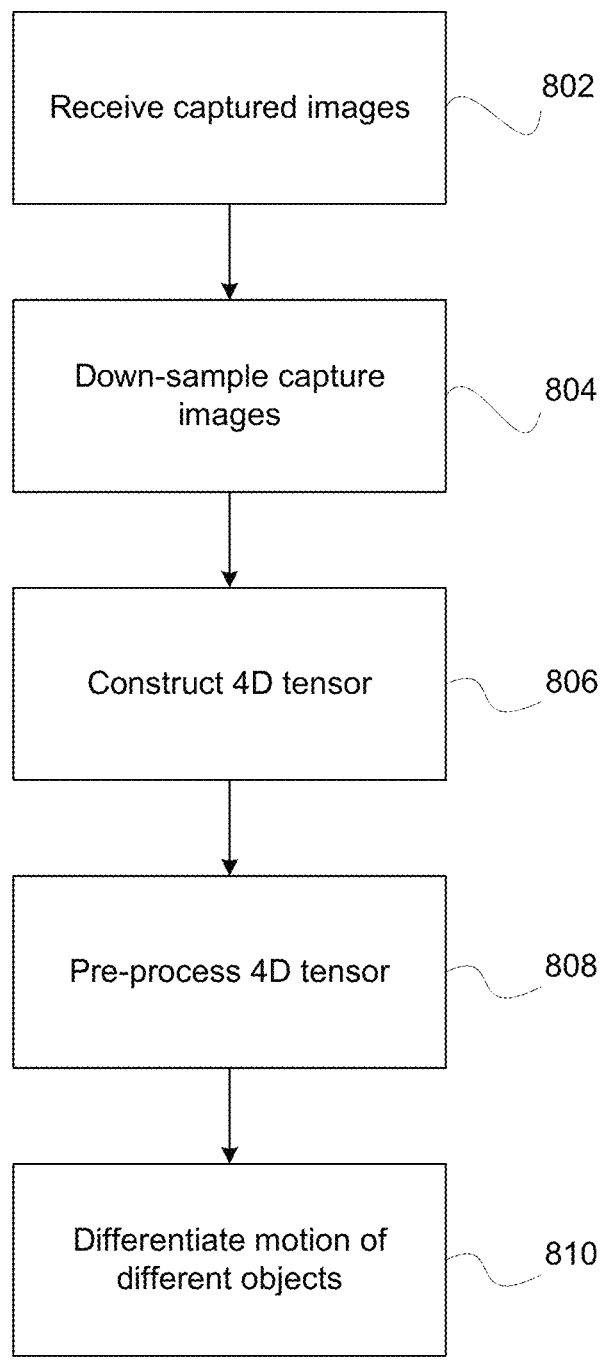
FIG. 8 is a flowchart showing an example method used in the detection of relevant motion

FIG. 8 is a flowchart showing a method 800. As shown in FIG. 8, the method begins at 802 when captured images (e.g., a series of images and/or one or more video clips) are received from, e.g., a surveillance camera and/or a security and surveillance system. At 804, the received captured images may be down-sampled either or both of spatially (i.e., reducing the resolution) and temporally (i.e., by subsampling limited frames uniformly from the series of images and/or video clips.) At 806, a 4D tensor of the down-sampled video may be constructed. The 4D tensor may be used as an input to 3D fully-convolutional neural network such as the ReMotENet 500. The output of the ReMotENet 500 network may consist of several binary prediction. These may include, for instance, whether there is any relevant motion in the video; whether the motion is caused by person/vehicles/pets, and so on.

At 808, the 4D tensor may be pre-processed by subtracting the previous frame for each time stamp. To better differentiate the motion of different objects, (e.g., people, animals, vehicles, etc.) it multi-task learning may also be employed Multi-task learning may allow prediction of both whether there is motion and of the spatial and temporal positions of that motion. At 810 it is also possible to utilize the predicted spatial-temporal positions of the motion as a soft attention to scale different features learned by the network to differentiate motion of different objects.

Figure 9:
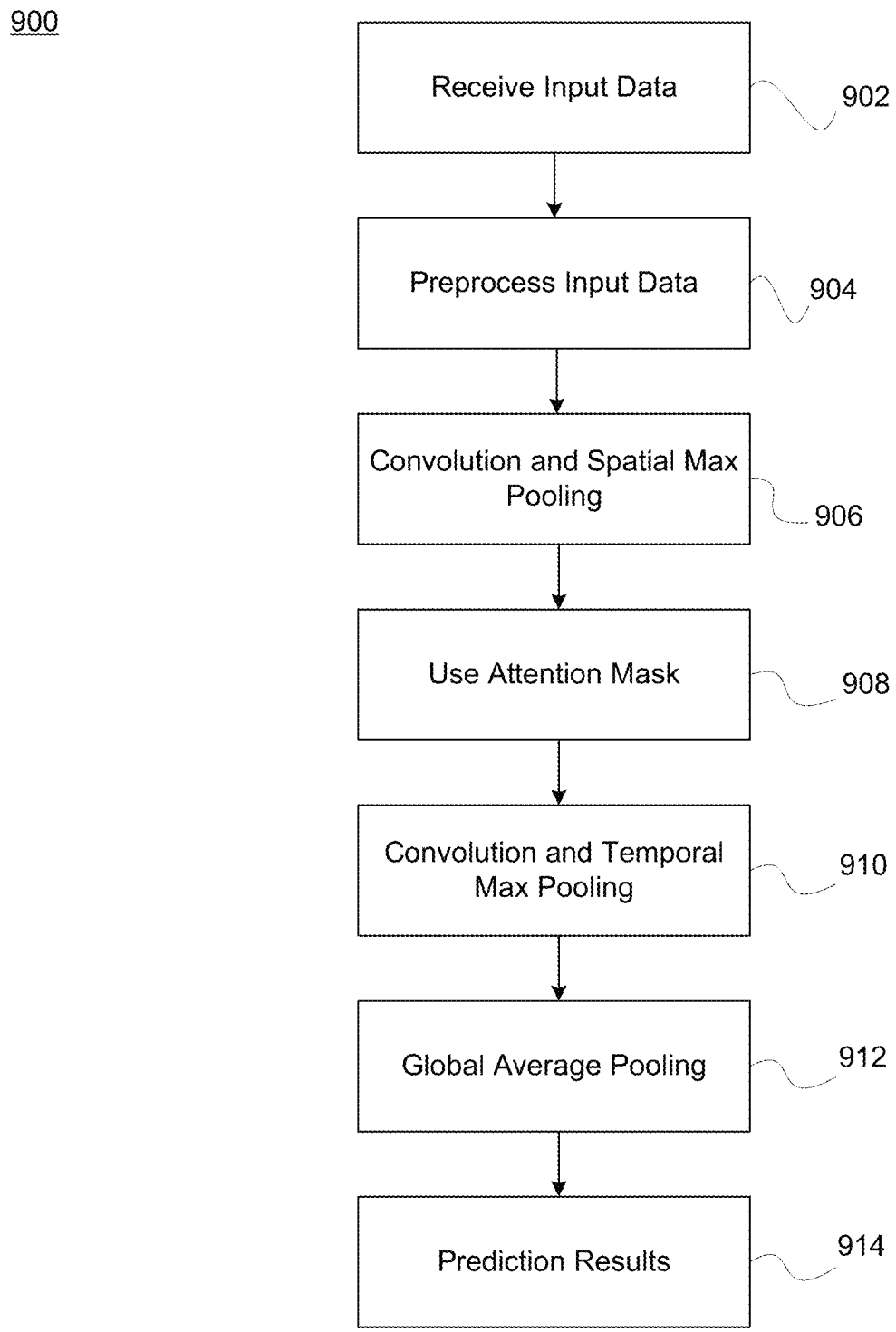
FIG. 9 is a flowchart showing an example method of detecting relevant motion.

FIG. 9 is a flowchart depicting a method 900 for predicting relevant motion. At step 902, input data (e.g., data 502) may be received. The input data may comprise a 4D tensor derived from video data. The data can then be pre-processed at 904. The pre-processing may be conducted using, spatial or temporal down-sampling, background subtraction, or some combination thereof. With background subtraction is used, a previous frame could be selected as a "reference frame" and subtracted from a current frame to result in a subtracted frame.

At 906, the pre-processed input data may be further processed using a convolution network with spatial max pooling. This may be accomplished using 3D ConvNets 506, which as discussed above, may comprise a low-level 3D convolution neural network of one or more stages (e.g., 5 stages) to abstract spatial features with spatial-wise max pooling. At 910, the input may be further processed using a convolution network and temporal max pooling. This may be accomplished using 3D ConvNets 508, which as discussed above, may employ a 3D convolutional neural network of one or more stages (e.g., 4 stages) that is configured to abstract temporal features using temporal-wise max pooling.

At 908, which may optionally occur between 906 and 910, an attention mask may be generated. In such cases, an element-wise multiplication between attention mask and the processed data from 906 may be performed. From there, method may proceed to 910.

At 912, global average pooling may be employed (e.g., 514) to aggregate spatial features. The Global Average Pooling may also rely on several convolution layers with one or more filters that can be used to predict final results at 914.

Figure 10:
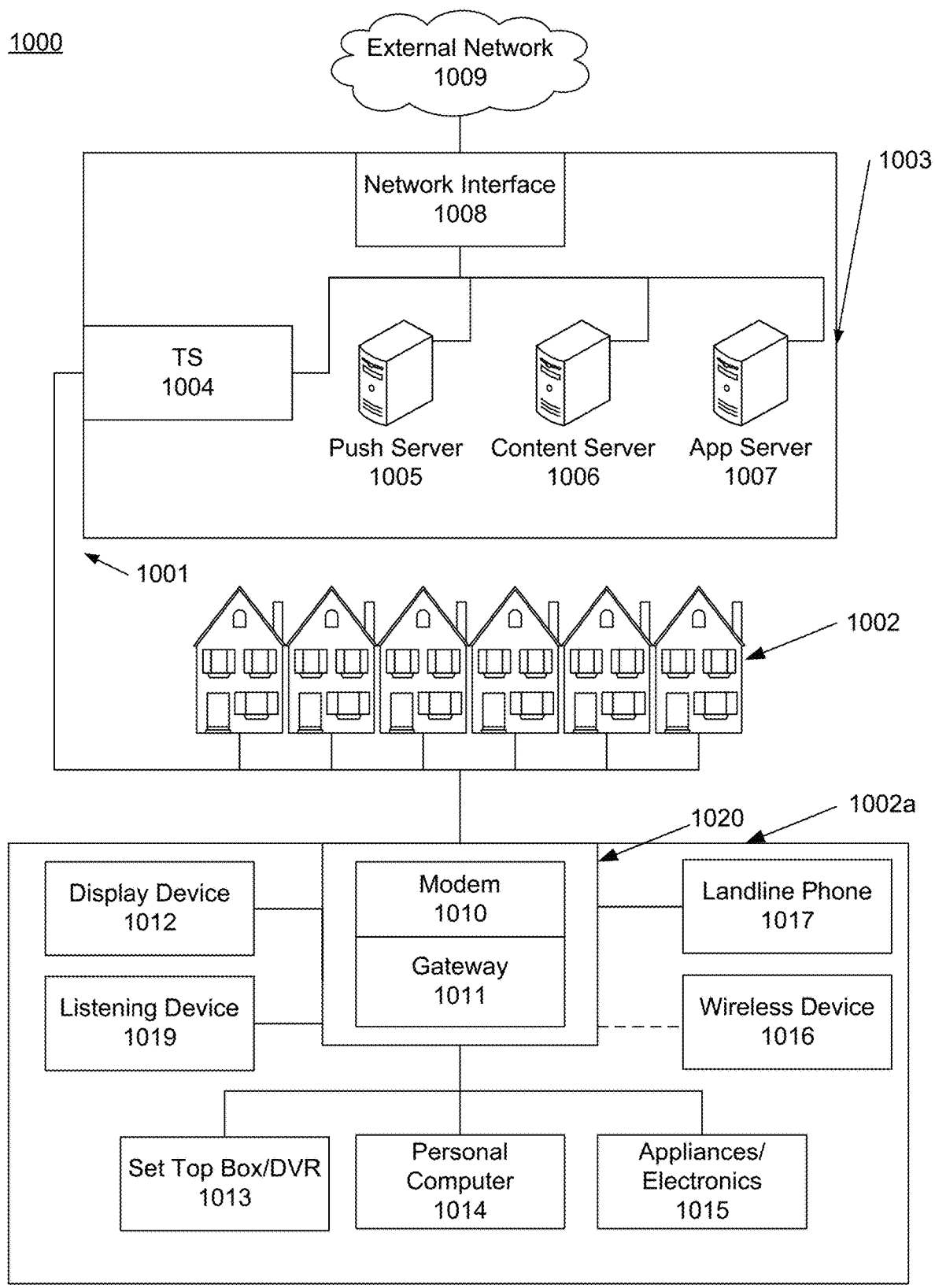
FIG. 10 shows an example network.

FIG. 10 shows a device network 1000 on which many of the various features described herein may be implemented. Network 1000 may be any type of information distribution network, such as satellite, telephone, cellular, wireless, optical fiber network, coaxial cable network, and/or a hybrid fiber/coax (HFC) distribution network. Additionally, network 1000 may be a combination of networks. Network 1000 may use a series of interconnected communication links 1001 (e.g., coaxial cables, optical fibers, wireless, etc.) and/or some other network (e.g., the Internet, a PSTN, etc.) to connect an end-point to a local office or headend 1003. In some cases, the headend 1003 may optionally include one or more graphical processing units (GPUs). End-points are shown in FIG. 10 as premises 1002 (e.g., businesses, homes, consumer dwellings, etc.) The local office 1003 (e.g., a data processing and/or distribution facility) may transmit information signals onto the links 1001, and each premises 1002 may have a receiver used to receive and process those signals.

There may be one link 1001 originating from the local office 1003, and it may be split a number of times to distribute the signal to various homes 1002 in the vicinity (which may be many miles) of the local office 1003. The links 1001 may include components not shown, such as splitters, filters, amplifiers, etc. to help convey the signal clearly, but in general each split introduces a bit of signal degradation. Portions of the links 1001 may also be implemented with fiber-optic cable, while other portions may be implemented with coaxial cable, other links, or wireless communication paths.

The local office 1003 may include a termination system (TS) 1004, such as a cable modem termination system (CMTS) in a HFC network, a DSLAM in a DSL network, a cellular base station in a cellular network, or some other computing device configured to manage communications between devices on the network of links 1001 and backend devices such as servers 1005-1007 (which may be physical servers and/or virtual servers, for example, in a cloud environment). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems or other user devices at the various premises 1002, and to receive upstream communications from those modems on one or more upstream frequencies. The local office 1003 may also include one or more network interfaces 1008, which can permit the local office 1003 to communicate with various other external networks 1009. These networks 1009 may include, for example, networks of Internet devices, telephone networks, cellular telephone networks, fiber optic networks, local wireless networks (e.g., WiMAX), satellite networks, and any other desired network, and the interface 1008 may include the corresponding circuitry needed to communicate on the network 1009, and to other devices on the network such as a cellular telephone network and its corresponding cell phones.

As noted above, the local office 1003 may include a variety of servers 1005-1007 that may be configured to perform various functions. The servers may be physical servers and/or virtual servers. For example, the local office 1003 may include a push notification server 1005. The push notification server 1005 may generate push notifications to deliver data and/or commands to the various homes 1002 in the network (or more specifically, to the devices in the homes 1002 that are configured to detect such notifications). The local office 1003 may also include a content server 1006. The content server 1006 may be one or more computing devices that are configured to provide content to users in the homes. This content may be, for example, video on demand movies, television programs, songs, text listings, etc. The content server 1006 may include software to validate user identities and entitlements, locate and retrieve requested content, encrypt the content, and initiate delivery (e.g., streaming) of the content to the requesting user and/or device.

The local office 1003 may also include one or more application servers 1007. An application server 1007 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the premises 1002. Another application server may be responsible for formatting and providing data for an interactive service being transmitted to the premises 1002 (e.g., chat messaging service, etc.). In some examples, an application server may implement a network controller 1203, as further described with respect to FIG. 12 below.

Premises 1002a may include an interface 1020. The interface 1020 may comprise a modem 1010, which may include transmitters and receivers used to communicate on the links 1001 and with the local office 1003. The modem 1010 may be, for example, a coaxial cable modem (for coaxial cable links 1001), a fiber interface node (for fiber optic links 1001), or any other desired device offering similar functionality. The interface 1020 may also comprise a gateway interface device 1011 or gateway. The modem 1010 may be connected to, or be a part of, the gateway interface device 1011. The gateway interface device 1011 may be a computing device that communicates with the modem 1010 to allow one or more other devices in the premises to communicate with the local office 1003 and other devices beyond the local office. The gateway 1011 may comprise a set-top box (STB), digital video recorder (DVR), computer server, or any other desired computing device. The gateway 1011 may also include (not shown) local network interfaces to provide communication signals to devices in the premises, such as display devices 1012 (e.g., televisions), additional STBs 1013, personal computers 1014, laptop computers 1015, wireless devices 1016 (wireless laptops and netbooks, mobile phones, mobile televisions, personal digital assistants (PDA), etc.), a landline phone 1017, and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), BLUETOOTH® interfaces (including, for example, BLUETOOTH® LE), ZIGBEE®, and others. The premises 1002a may further include one or more listening devices 1019, the operation of which will be further described below.

Figure 11:
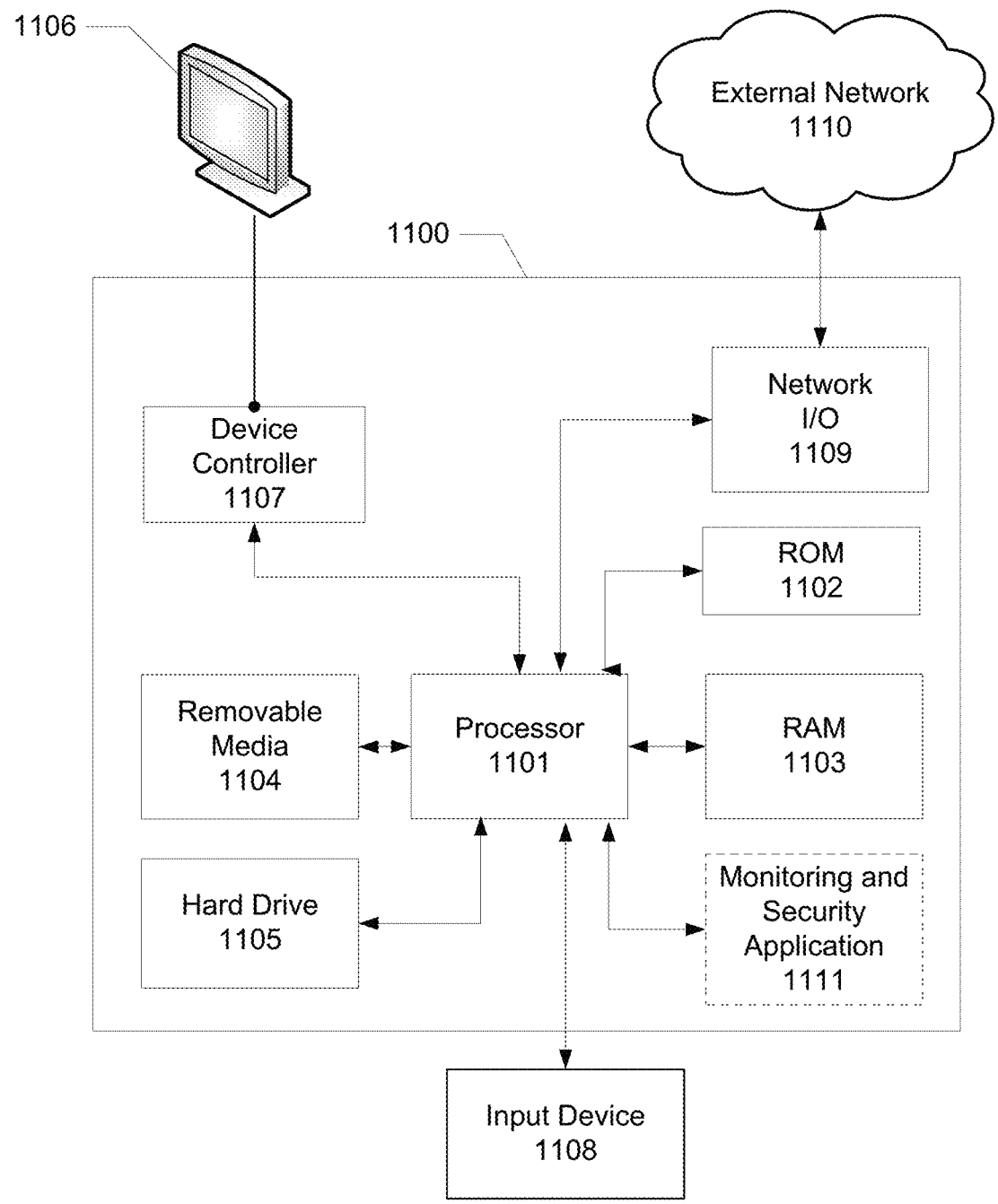
FIG. 11 shows example hardware elements of a computing device.

FIG. 11 shows a computing device 1100 on which various elements described herein can be implemented. The computing device 1100 may include one or more processors 1101, which may execute instructions of a computer program to perform any of the features described herein. The instructions may be stored in any type of computer-readable medium or memory, to configure the operation of the processor 1101. For example, instructions may be stored in a read-only memory (ROM) 1102, random access memory (RAM) 1103, removable media 1104, such as a Universal Serial Bus (USB) drive, compact disk (CD) or digital versatile disk (DVD), floppy disk drive, or any other desired electronic storage medium. Instructions may also be stored in an attached (or internal) hard drive 1105. The computing device 1100 may include one or more output devices, such as a display 1106 (or an external television), and may include one or more output device controllers 1107, such as a video processor. There may also be one or more user input devices 1108, such as a remote control, keyboard, mouse, touch screen, microphone, etc. The computing device 1100 may also include one or more network interfaces, such as input/output circuits 1109 (such as a network card) to communicate with an external network 1110. The network interface may be a wired interface, wireless interface, or a combination of the two. In some examples, the interface 1109 may include a modem (e.g., a cable modem), and network 1110 may include the communication links and/or networks shown in FIG. 10, or any other desired network.

In some examples, the computing device 1100 may include a monitoring and security application 1111 that implements one or more security or monitoring features of the present description. The monitoring and security application 1111 will be further described below with respect to FIG. 12.

FIG. 11 shows a hardware configuration. Modifications may be made to add, remove, combine, divide, etc. components as desired. Additionally, the components shown may be implemented using basic computing devices and components, and the same components (e.g., the processor 1101, the storage 1102, the user interface, etc.) may be used to implement any of the other computing devices and components described herein.

Figure 12:
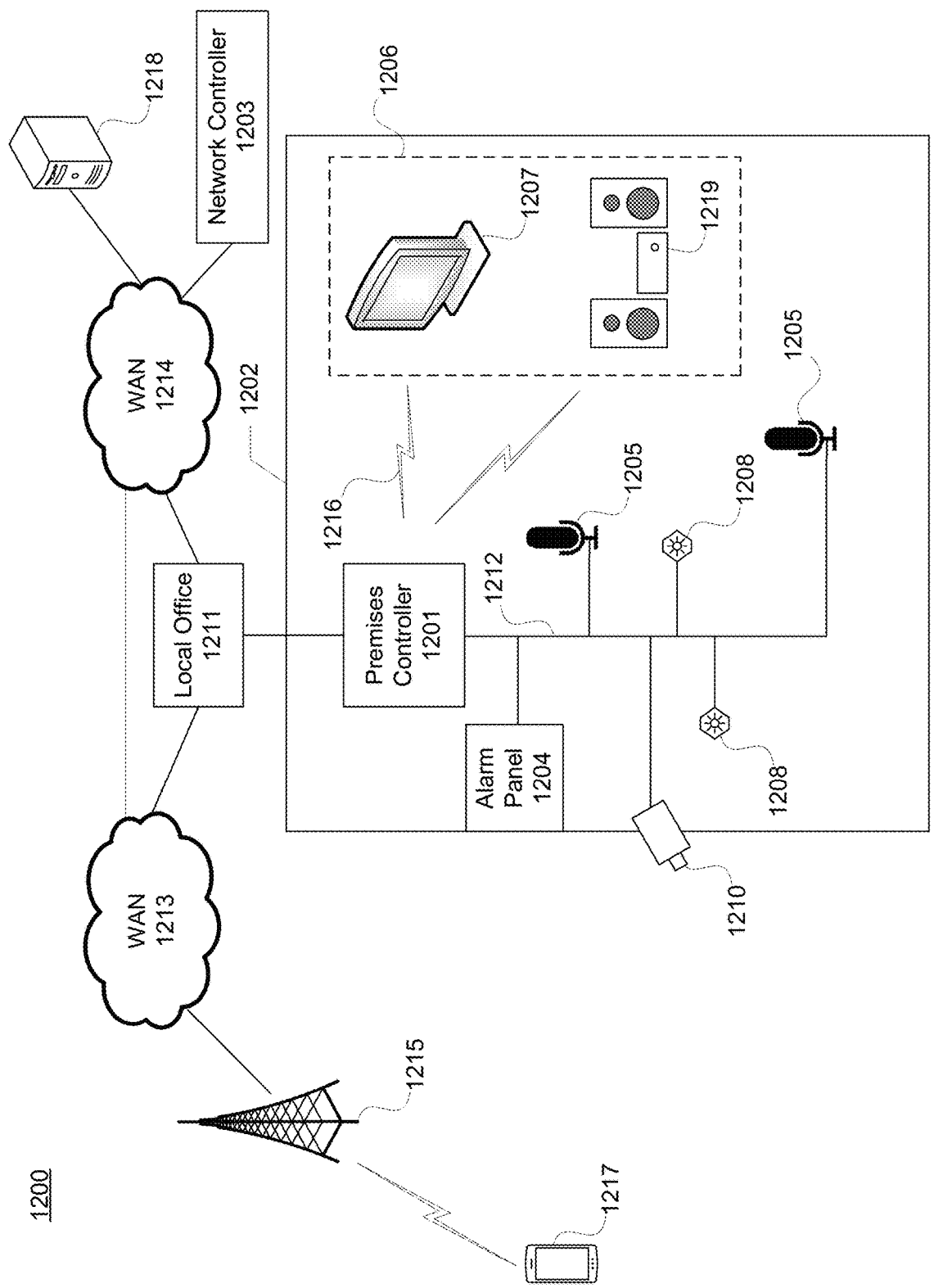
FIG. 12 shows an example monitoring and security system within a premises.

FIG. 12 shows a monitoring and security system 1200 for implementing features described herein. A premises includes a premises controller 1201. The premises controller 1201 may monitor the premises 1202 and simulates the presence of a user or resident of the premises 1202. The premises controller 1201 may monitor recorded audio signals in order to detect audio patterns of normal activities at the premises. The detected patterns may comprise, for example, indications of one or more habits of residents of the premises, for example, that a resident usually watches television in the afternoons, sometimes listens to music in the evenings, and/or other habits indicating usage patterns of media devices. When the resident is away, the premises controller 1201 may command devices of the premises 1202 to simulate the user's presence. For example, the premises controller 1201 may turn on the television in the afternoon and turn on music in the evening to create the appearance that a resident is at home.

The premises controller 1201 located in premises 1202 connects to a local office 1211, which in turn connects via WAN 1214 to network controller 1203. Premises 1202 further contains a plurality of listening devices 1205 (e.g., devices that include one or more microphones) and/or video cameras 1210 for monitoring premises 1202. An alarm panel 1204 connects to the premises controller 1201. Additionally, the premises controller 1201 may control user entertainment devices 1206, including a television 1207 and a stereo 1219 via transmission(s) 1216. The premises controller 1201 may also include home automation functions enabling communication with and control of lights 1208 and other such devices. Various devices such as alarm panel 1204, listening devices 1205, lights 1208, and video camera 1210 may be connected to premises controller 1201 via a local network 1212.

The listening devices 1205 may be scattered throughout the premises 1202. For example, one or more of the listening devices 1205 may be located in each room, or in select rooms, of the premises 1202. Each listening device 1205 may include one or more microphones for receiving/recording audio signals. The listening devices 1205 may periodically transmit the received audio signals to the premises controller 1201 for purposes of monitoring the premises 1202. The premises controller 1201 may analyze and process the monitored audio signals independently or in conjunction with network controller 1203. The listening devices 1205 may send audio signals to the premises controller 1201 using dedicated wires, using the local network 1212, or in any other manner. One or more listening devices 1205 may be integrated with another device, such as an alarm panel 1204.

The alarm panel 1204 may control security settings of the monitoring and security system 1200. For example, a user may change an arming mode of the monitoring and security system 1200 via the alarm panel 1204 in order to enable or disable certain security features. In some examples, arming modes may include an "away" mode, a "night" mode, and/or a "stay" mode, among others. The premises controller 1201 may check the modes set at the alarm panel 1304 in order to determine a mode of the premises controller 1201. When a mode indicates a user is at home, the premises controller 1201 may monitor the premises 1202 to detect patterns of normal activity and behavior. When a mode indicates a user is away, the premises controller 1201 may simulate the user's presence at the premises.

In the shown example, a portable communication device 1217 (e.g., a smartphone) and/or a personal computer 1218 may connect to the premises 1202 via WAN 1213 (in conjunction with cellular network 1215) and/or WAN 1214. In some examples, the portable communication device 1217 and/or the personal computer 1218 may communicate with network controller 1303, which may in turn relay communications to and from premises controller 1301. Such communications may include requesting information from the security system, modifying a setting, or the like. For example, a resident could modify a user profile generated by premises controller 1201 in order to determine what actions the premises controller 1201 takes in the user's absence from premises 1202.

The portable communication device 1217 and/or personal computer 1218 may communicate with premises controller 1201 without the involvement of network controller 1203. In some examples, the network controller 1203 may perform the functions described herein with respect to premises controller 1201 instead of or in addition to premises controller 1201. The network controller 1203 may be integrated with the local office 1211 (e.g., as an application server 1107 as shown by FIG. 1). Accordingly, an application server 1007 embodying the network controller 1203 may perform any of the techniques described herein.

The premises controller 1201 may be implemented as a hardware or software component of computing device 1100 (e.g., as monitoring and security application 1111). In other examples, premises controller 1201 may be implemented as a standalone device.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, by a computing device, a plurality of images, wherein the plurality of images comprises a temporal sequence of spatially dimensioned images;
determining, based on applying a plurality of first filters to the plurality of images, a plurality of first features associated with the plurality of images, wherein the plurality of first filters comprise one or more filters based on one or more spatial dimensions;
determining, based on applying a plurality of second filters to the plurality of first features, a plurality of second features associated with the plurality of images, wherein the plurality of second filters comprise one or more filters based on a temporal dimension; and
determining, based on the plurality of second features, whether the plurality of images indicates a motion of an object.

2. The method of claim 1, wherein the plurality of first filters further comprise one or more filters based on the one or more spatial dimensions and the temporal dimension, wherein the plurality of second filters further comprise one or more filters based on the one or more spatial dimensions and the temporal dimension.

3. The method of claim 1, wherein the one or more filters based on the one or more spatial dimensions are independent of the temporal dimension, and wherein the one or more filters based on the temporal dimension are independent of the one or more spatial dimensions.

4. The method of claim 1, wherein the plurality of first filters further comprise one or more first convolution layers of a convolutional neural network, wherein the one or more filters based on the one or more spatial dimensions comprise one or more spatial-only max-pooling layers of the convolutional neural network, wherein the plurality of second filters further comprise one or more second convolution layers of the convolutional neural network, and wherein the one or more filters based on the temporal dimension comprise one or more temporal-only max-pooling layers of the convolutional neural network.

5. The method of claim 4, wherein the applying the plurality of first filters to the plurality of images comprises applying a spatial-only max-pooling layer, of the one or more spatial-only max-pooling layers, after applying each of the one or more first convolution layers, and wherein the applying the plurality of second filters to the plurality of first features comprises applying a temporal-only max-pooling layer, of the one or more temporal-only max-pooling layers, after applying each of the one or more second convolution layers.

6. The method of claim 1, further comprising:
based on down-sampling a plurality of frames based on video content, determining a sequence of down-sampled frames; and
based on subtracting a reference frame from each of the sequence of down-sampled frames, determining the plurality of images.

7. The method of claim 1, wherein the plurality of images is based on video content received from a security system.

8. The method of claim 1, further comprising applying, to the plurality of first features, an attention filter associated with a plurality of probabilities of the plurality of first features corresponding to the motion of the object.

9. The method of claim 1, wherein the determining whether the plurality of images indicates the motion of the object is further based on applying, to the plurality of second features, a global average pooling layer of a convolutional neural network and one or more convolution layers of the convolutional neural network.

10. The method of claim 1, wherein the object comprises a person or a vehicle.

11. The method of claim 1, further comprising determining, based on training a neural network using a loss function, the plurality of first filters and the plurality of second filters.

12. The method of claim 1, further comprising, based on determining that the plurality of images indicates the motion of the object, one or more of:
triggering an alarm of a security system;
causing a security system to record video content;
performing a video search based on the indicated motion of the object; or
performing a video summarization based on the indicated motion of the object.

13. An apparatus comprising:
one or more processors; and
memory storing instructions that, when executed by the one or more processors, cause the apparatus to:

receive a plurality of images, wherein the plurality of images comprises a temporal sequence of spatially dimensioned images;
determine, based on applying a plurality of first filters to the plurality of images, a plurality of first features associated with the plurality of images, wherein the plurality of first filters comprise one or more filters based on one or more spatial dimensions;
determine, based on applying a plurality of second filters to the plurality of first features, a plurality of second features associated with the plurality of images, wherein the plurality of second filters comprise one or more filters based on a temporal dimension; and
determine, based on the plurality of second features, whether the plurality of images indicates a motion of an object.

14. The apparatus of claim 13, wherein the plurality of first filters further comprise one or more first convolution layers of a convolutional neural network, wherein the one or more filters based on the one or more spatial dimensions comprise one or more spatial-only max-pooling layers of the convolutional neural network, wherein the plurality of second filters further comprise one or more second convolution layers of the convolutional neural network, and wherein the one or more filters based on the temporal dimension comprise one or more temporal-only max-pooling layers of the convolutional neural network.

15. The apparatus of claim 13, wherein the instructions, when executed by the one or more processors, further cause the apparatus to:
based on down-sampling a plurality of frames based on video content, determine a sequence of down-sampled frames; and
based on subtracting a reference frame from each of the sequence of down-sampled frames, determine the plurality of images.

16. The apparatus of claim 13, wherein the instructions, when executed by the one or more processors, further cause the apparatus to apply, to the plurality of first features, an attention filter associated with a plurality of probabilities of the plurality of first features corresponding to the motion of the object.

17. The apparatus of claim 13, wherein the instructions, when executed by the one or more processors, further cause the apparatus to, based on determining that the plurality of images indicates the motion of the object, one or more of:
trigger an alarm of a security system;
cause a security system to record video content;
perform a video search based on the indicated motion of the object; or
perform a video summarization based on the indicated motion of the object.

18. A non-transitory computer-readable medium storing instructions that, when executed, cause:
receiving a plurality of images, wherein the plurality of images comprises a temporal sequence of spatially dimensioned images;
determining, based on applying a plurality of first filters to the plurality of images, a plurality of first features associated with the plurality of images, wherein the plurality of first filters comprise one or more filters based on one or more spatial dimensions;
determining, based on applying a plurality of second filters to the plurality of first features, a plurality of second features associated with the plurality of images, wherein the plurality of second filters comprise one or more filters based on a temporal dimension; and determining, based on the plurality of second features, whether the plurality of images indicates a motion of an object.

19. The non-transitory computer-readable medium of claim 18, wherein the instructions, when executed, further cause:

based on down-sampling a plurality of frames based on video content, determining a sequence of down-sampled frames; and based on subtracting a reference frame from each of the sequence of down-sampled frames, determining the plurality of images.

20. The non-transitory computer-readable medium of claim 18, wherein the instructions, when executed, further cause applying, to the plurality of first features, an attention filter associated with a plurality of probabilities of the plurality of first features corresponding to the motion of the object.

\* \* \* \* \*

UNITED STATES PATENT AND TRADEMARK OFFICE
CERTIFICATE OF CORRECTION

PATENT NO. : 10,861,168 B2
APPLICATION NO. : 16/125203
DATED : December 8, 2020
INVENTOR(S) : Yu et al.

Page 1 of 1

It is certified that error appears in the above-identified patent and that said Letters Patent is hereby corrected as shown below:

On the Title Page

Column 2, (57) Abstract, Line 9:
Please delete "The" and insert --the--

In the Specification

Column 7, Detailed Description, Line 46:
Please delete "acceserated" and insert --accelerated--

Column 11, Detailed Description, Line 22:
Please delete "oth" and insert --$i^{th}$--

Column 18, Detailed Description, Line 12:
Please delete "1303," and insert --1203--

Column 18, Detailed Description, Line 13:
Please delete "1301." and insert --1201.--

Column 18, Detailed Description, Line 27:
Please delete "1107" and insert --1007--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*